United States Patent
Yun et al.

(10) Patent No.: US 11,341,965 B2
(45) Date of Patent: May 24, 2022

(54) SYSTEM FOR PROCESSING USER UTTERANCE AND OPERATING METHOD THEREOF

(71) Applicant: Samsung Electronics Co., Ltd., Suwon-si (KR)

(72) Inventors: Hyejeong Yun, Suwon-si (KR); Jaewan Jang, Suwon-si (KR); Daegyun Chun, Suwon-si (KR); Jaeyung Yeo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 250 days.

(21) Appl. No.: 16/598,461

(22) Filed: Oct. 10, 2019

(65) Prior Publication Data

US 2020/0118563 A1   Apr. 16, 2020

(30) Foreign Application Priority Data

Oct. 10, 2018 (KR) ........................ 10-2018-0120636

(51) Int. Cl.
*G10L 15/22* (2006.01)
*G10L 15/08* (2006.01)
*G06F 3/16* (2006.01)

(52) U.S. Cl.
CPC .............. *G10L 15/22* (2013.01); *G06F 3/167* (2013.01); *G10L 15/08* (2013.01); *G10L 2015/088* (2013.01); *G10L 2015/223* (2013.01)

(58) Field of Classification Search
None
See application file for complete search history.

(56) References Cited

U.S. PATENT DOCUMENTS 9,349,369 B2 * 5/2016 Reichardt .............. H04N 7/163
10,187,677 B1 * 1/2019 Panchaksharaiah .... G10L 15/18
(Continued)

FOREIGN PATENT DOCUMENTS

JP         2007-201742 A    8/2007
KR   10-2005-0080873 A    8/2005
(Continued)

OTHER PUBLICATIONS

International Search Report with Written Opinion dated Jan. 22, 2020; International Appln. No. PCT/KR2019/013280.

*Primary Examiner* — Brian L Albertalli
(74) *Attorney, Agent, or Firm* — Jefferson IP Law, LLP

(57) ABSTRACT

An electronic device for, in response to a user utterance, recommending content suitable to a user, and an operating method thereof are provided. The electronic device includes a user interface, a microphone, a speaker, at least one processor operatively connected with the user interface, the microphone, and the speaker, and at least one memory operatively connected with the processor. The memory stores instructions which, when executed, configure the processor to receive a first user utterance requesting content or suggesting a request for content, through the microphone, provide a list of contents received from at least one content provider, based at least partly on user profile information, receive a user input selecting content from the list of contents, enable a service provided by a content provider of the selected content, after enabling of the service, receive a second user utterance, and provide at least one service.

20 Claims, 16 Drawing Sheets

(56) References Cited

U.S. PATENT DOCUMENTS

| | | | |
|---|---|---|---|
| 10,733,987 B1* | 8/2020 | Govender | G10L 17/06 |
| 11,069,347 B2* | 7/2021 | Orr | G06F 16/435 |
| 2002/0152117 A1 | 10/2002 | Cristofalo et al. | |
| 2005/0182931 A1 | 8/2005 | Robert et al. | |
| 2005/0217459 A1 | 10/2005 | Murakoshi | |
| 2012/0302270 A1* | 11/2012 | Sathish | G06Q 30/02 |
| | | | 455/500 |
| 2013/0145400 A1* | 6/2013 | Chang | H04N 21/42203 |
| | | | 725/53 |
| 2013/0311997 A1 | 11/2013 | Gruber et al. | |
| 2014/0052452 A1* | 2/2014 | Koivuniemi | H04N 21/4828 |
| | | | 704/275 |
| 2016/0092447 A1* | 3/2016 | Venkataraman | G06F 16/732 |
| | | | 707/765 |
| 2017/0357635 A1* | 12/2017 | Mohaideen P | G06N 3/02 |
| 2018/0190279 A1* | 7/2018 | Anderson | G10L 15/1822 |
| 2018/0367862 A1* | 12/2018 | Horii | H04N 21/4668 |
| 2019/0294630 A1* | 9/2019 | Alakoye | G06F 16/635 |

FOREIGN PATENT DOCUMENTS

| | | |
|---|---|---|
| KR | 10-2005-0113848 A | 12/2005 |
| KR | 10-2006-0120771 A | 11/2006 |
| KR | 10-2011-0081914 A | 7/2011 |

\* cited by examiner

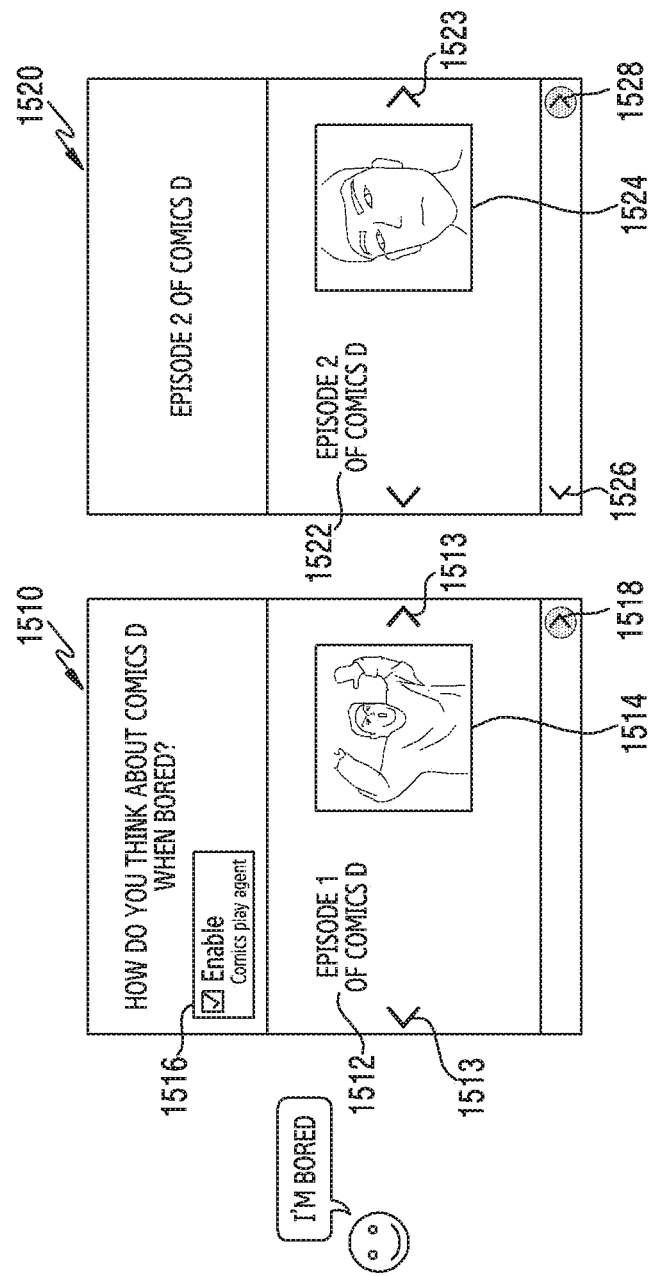

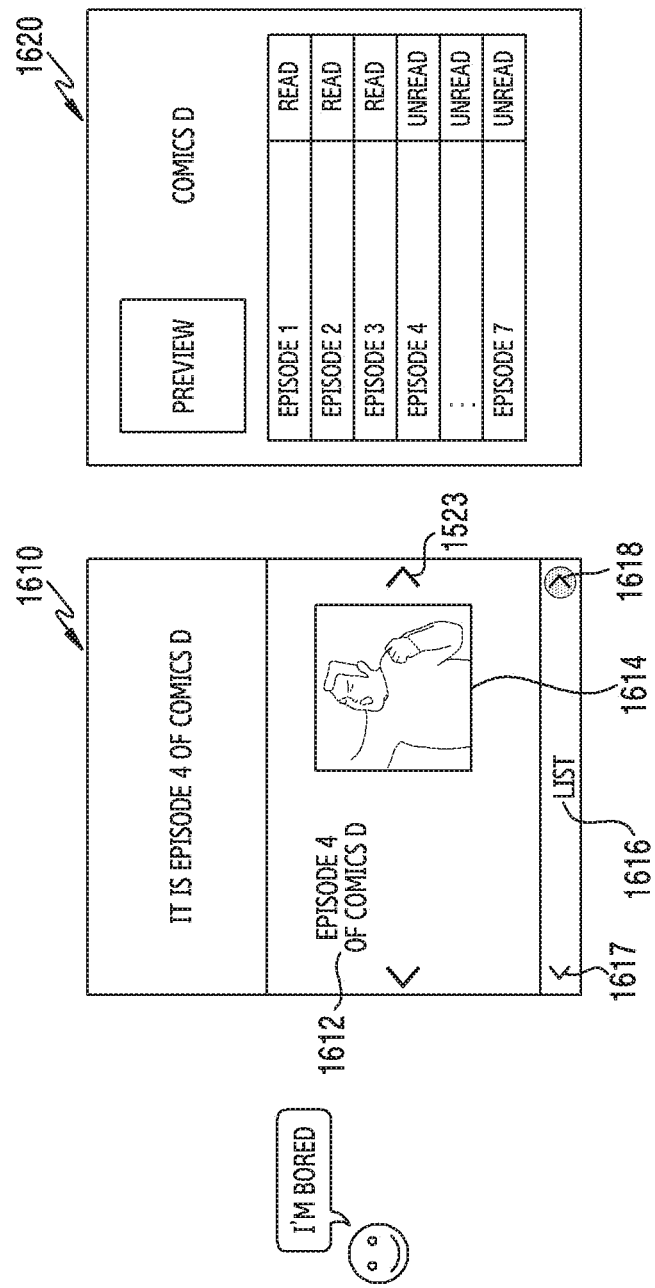

SYSTEM FOR PROCESSING USER UTTERANCE AND OPERATING METHOD THEREOF

CROSS-REFERENCE TO RELATED APPLICATION(S)

This application is based on and claims priority under 35 U.S.C. § 119(a) of a Korean patent application number 10-2018-0120636, filed on Oct. 10, 2018, in the Korean Intellectual Property Office, the disclosure of which is incorporated by reference herein in its entirety.

BACKGROUND

1. Field

The disclosure relates to an electronic device for, in response to a user utterance, recommending content suitable to a user, and an operating method thereof.

2. Description of Related Art

At present, portable electronic devices have been popularized such as smart phones or tablet personal computers (PCs). In recent years, electronic devices recognizing a user utterance to perform a specific function are being gradually increased. The electronic devices recognizing the user utterance can not only provide services to users of the electronic devices by executing a function of the electronic device (e.g., an application installed in the electronic device), but also can provide services related to various 3rd party service providers.

Like this, a speech recognition service is being implemented as an integrated platform which covers even services related to a plurality of 3rd party service providers, without being limited to a service capable of being provided in an electronic device of a user.

The above information is presented as background information only to assist with an understanding of the disclosure. No determination has been made, and no assertion is made, as to whether any of the above might be applicable as prior art with regard to the disclosure.

SUMMARY

When a plurality of mutually different 3rd party service providers are associated with a speech recognition service, a user has a need to directly call a voice agent corresponding to a specific 3rd party service provider in order to receive a service of the specific 3rd party service provider. For example, the user has a need to recognize a rule of calling the voice agent corresponding to the specific 3rd party service provider. Also, because the user cannot exactly know the service (or content) which is being provided by the specific 3rd party service provider, the user who calls the voice agent corresponding to the specific 3rd party service provider has a need to have to search or select desired content through a direct interaction with the voice agent corresponding to the specific 3rd party service provider.

Aspects of the disclosure are to address at least the above-mentioned problems and/or disadvantages and to provide at least the advantages described below. Accordingly, an aspect of the disclosure is to provide an apparatus and method for a user interface, a microphone, a speaker, at least one processor operatively connected with the user interface, the microphone, and the speaker, and at least one memory operatively connected with the processor. The memory may store instructions which, when executed, configure the processor to receive a first user utterance requesting content or suggesting a request for content, through the microphone, provide a list of contents received from at least one content provider, based at least partly on user profile information, receive a user input selecting content from the list of contents, enable a service provided by a content provider of the selected content, after enabling of the service, receive a second user utterance related to the enabled service, through the microphone, and provide at least one service through the enabled content providing service.

Additional aspects will be set forth in part in the description which follows and, in part, will be apparent from the description, or may be learned by practice of the presented embodiments.

In accordance with an aspect of the disclosure, an electronic device and an operating method thereof are provided. The electronic device and the operating method, in response to a user utterance, introduce a voice agent of a 3d party service provider which is useful for and is suitable to a user, thereby allowing the user to more easily access a service (or content). Also, the electronic device of various embodiments of the disclosure and the operating method thereof may provide history information related to user's use of content to the 3rd party service provider, thereby allowing the user to keep continuing an experience of use of content.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIGS. 15A, 15B, 16A and 16B are diagrams illustrating a user interface provided by a speech recognition system according to various embodiments of the disclosure.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
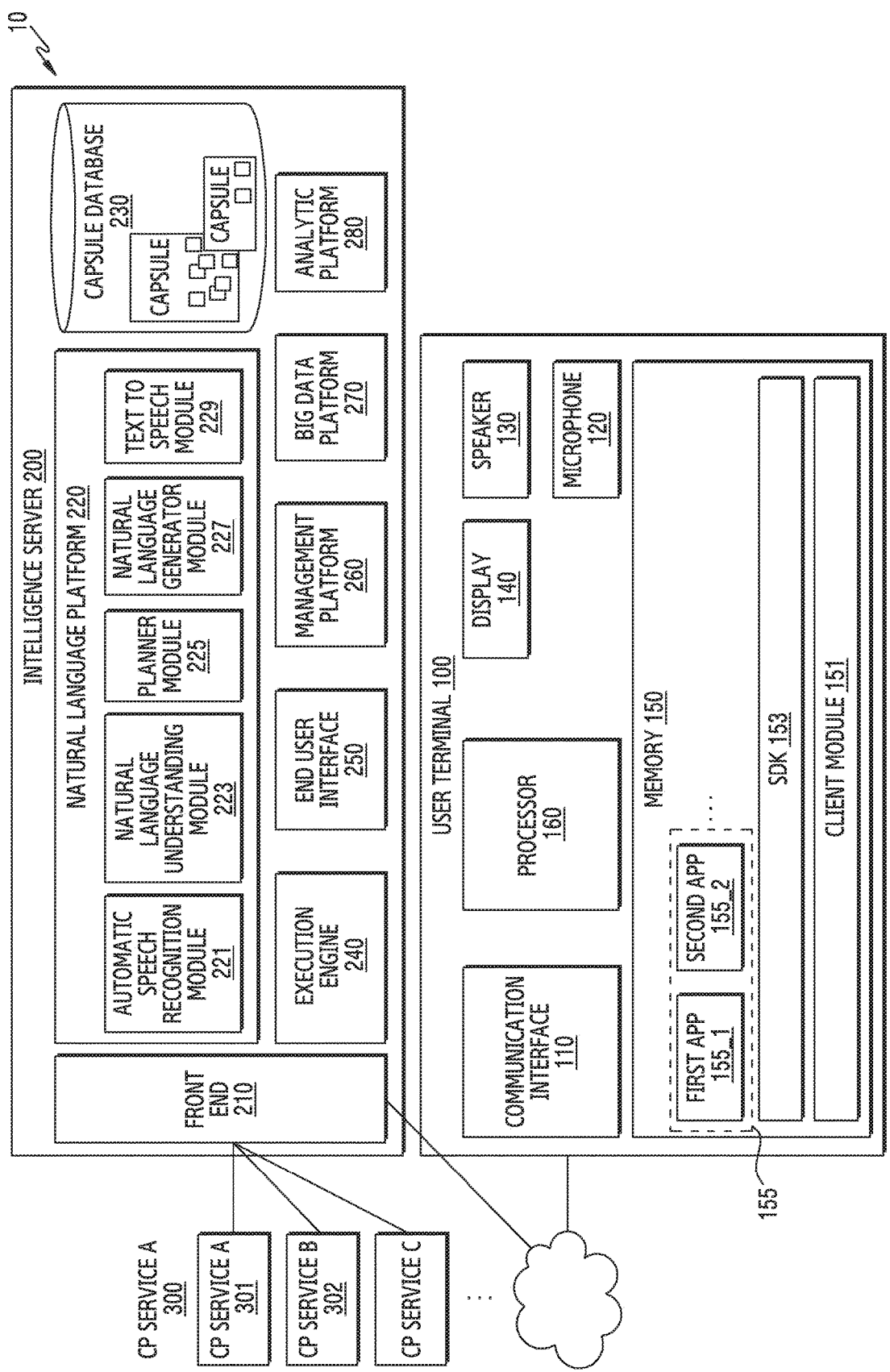
FIG. 1 is a block diagram illustrating an integrated intelligence system according to an embodiment of the disclosure.

FIG. 1 is a block diagram illustrating an integrated intelligence system according to an embodiment of the disclosure.

Referring to FIG. 1, the integrated intelligence system 10 of an embodiment may include a user terminal 100, an intelligence server 200, and a service server 300.

The user terminal 100 of an embodiment may be a terminal device (or an electronic device) connectable to the Internet, and may be, for example, a portable phone, a smart phone, a personal digital assistant (PDA), a notebook computer, a television (TV), a home appliance, a wearable device, a head mounted device (HMD), or a smart speaker.

According to an embodiment illustrated, the user terminal 100 may include a communication interface 110, a microphone 120, a speaker 130, a display 140, a memory 150, or a processor 160. The enumerated constituent elements may be mutually operatively or electrically connected.

The communication interface 110 of an embodiment may be configured to connect with an external device and transmit and/or receive data with the external device. The microphone 120 of an embodiment may receive and convert a sound (e.g., a user utterance) into an electrical signal. The speaker 130 of an embodiment may output the electrical signal by a sound (e.g., a voice). The display 140 of an embodiment may be configured to display an image or video. The display 140 of an embodiment may also display a graphical user interface (GUI) of an executed app (or application program).

The memory 150 of an embodiment may store a client module 151, a software development kit (SDK) 153, and a plurality of apps 155. The client module 151 and the SDK 153 may configure a framework (or solution program) for performing a generic function. Also, the client module 151 or the SDK 153 may configure a framework for processing a voice input.

The plurality of apps 155 of the memory 150 of an embodiment may be programs for performing specified functions. According to an embodiment, the plurality of apps 155 may include a first app 155_1 and a second app 155_2. According to an embodiment, the plurality of apps 155 may include a plurality of operations for performing specified functions, respectively. For example, the apps may include an alarm app, a message app, and/or a schedule app. According to an embodiment, the plurality of apps 155 may be executed by the processor 160, to execute at least some of the plurality of operations in sequence.

The processor 160 of an embodiment may control a general operation of the user terminal 100. For example, the processor 160 may be electrically connected with the communication interface 110, the microphone 120, the speaker 130, and the display 140, to perform a specified operation.

The processor 160 of an embodiment may also execute a program stored in the memory 150, to perform a specified function. For example, by executing at least one of the client module 151 or the SDK 153, the processor 160 may perform the following operation for processing a voice input. The processor 160 may, for example, control operations of the plurality of apps 155 through the SDK 153. The following operation explained as an operation of the client module 151 or the SDK 153 may be an operation by the execution of the processor 160.

The client module 151 of an embodiment may receive a voice input. For example, the client module 151 may receive a voice signal corresponding to a user utterance which is sensed through the microphone 120. The client module 151 may send the received voice input to the intelligence server 200. The client module 151 may send, together with the received voice input, state information of the user terminal 100 to the intelligence server 200. The state information may be, for example, app execution state information.

The client module 151 of an embodiment may receive a result corresponding to the received voice input. For example, in response to the intelligence server 200 being able to provide the result corresponding to the received voice input, the client module 151 may receive the result corresponding to the received voice input. The client module 151 may display the received result on the display 140.

The client module 151 of an embodiment may receive a plan corresponding to the received voice input. The client module 151 may display, on the display 140, results of executing a plurality of operations of an app according to a plan. For example, the client module 151 may display the results of execution of the plurality of operations on the display in sequence. For another example, the user terminal 100 may display only some results (e.g., a result of the last operation) of executing the plurality of operations on the display.

According to an embodiment, the client module 151 may receive, from the intelligence server 200, a request for obtaining information necessary for providing a result corresponding to a voice input. According to an embodiment, in response to the request, the client module 151 may send the necessary information to the intelligence server 200.

The client module 151 of an embodiment may send result information executing a plurality of operations according to a plan, to the intelligence server 200. By using the result information, the intelligence server 200 may identify that the received voice input is processed rightly.

The client module 151 of an embodiment may include a speech recognition module. According to an embodiment, the client module 151 may recognize a voice input performing a limited function, through the speech recognition module. For example, the client module 151 may perform an intelligence app for processing a voice input for performing an organic operation through a specified input (e.g., wake up!).

The intelligence server 200 of an embodiment may receive information related to a user voice input from the user terminal 100 through a communication network. According to an embodiment, the intelligence server 200 may alter data related to the received voice input into text data. According to an embodiment, the intelligence server 200 may generate a plan for performing a task corresponding to the user voice input based on the text data.

According to an embodiment, the plan may be generated by an artificial intelligent (AI) system. The artificial intelligent (AI) system may be a rule-based system as well, and may be a neural network-based system (e.g., feedforward neural network (FNN)) and/or a recurrent neural network (RNN)) as well. Or, the artificial intelligent system may be a combination of the aforementioned or be an artificial intelligent system different from this as well. According to an embodiment, the plan may be selected from a set of predefined plans, or in response to a user request, may be generated in real time. For example, the artificial intelligent system may select at least a plan among a predefined plurality of plans.

The intelligence server 200 of an embodiment may send a result of the generated plan to the user terminal 100 or may send the generated plan to the user terminal 100. According to an embodiment, the user terminal 100 may display the result of the plan on the display. According to an embodiment, the user terminal 100 may display a result of executing an operation of the plan on the display.

The intelligence server 200 of an embodiment may include a front end 210, a natural language platform 220, a capsule database (DB) 230, an execution engine 240, an end user interface 250, a management platform 260, a big data platform 270, or an analytic platform 280.

The front end 210 of an embodiment may receive a voice input from the user terminal 100. The front end 210 may send a response corresponding to the voice input.

According to an embodiment, the natural language platform 220 may include an automatic speech recognition module (ASR module) 221, a natural language understanding module (NLU module) 223, a planner module 225, a natural language generator module (NLG module) 227, or a text to speech module (TTS module) 229.

The automatic speech recognition module 221 of an embodiment may convert a voice input received from the user terminal 100, into text data. By using the text data of the voice input, the natural language understanding module 223 of an embodiment may grasp a user intention. For example, the natural language understanding module 223 may perform syntactic analysis or semantic analysis, to grasp the user intention. The natural language understanding module 223 of an embodiment may grasp a meaning of a word extracted from the voice input by using a linguistic feature (e.g., syntactic factor) of a morpheme or phrase, and match the grasped meaning of the word with an intention, to identify the user intention.

The planner module 225 of an embodiment may generate a plan by using an intention and parameter identified in the natural language understanding module 223. According to an embodiment, the planner module 225 may identify a plurality of domains necessary for performing a task, based on the identified intention. The planner module 225 may identify a plurality of operations included in each of the plurality of domains identified based on the intention. According to an embodiment, the planner module 225 may identify a parameter necessary for executing the identified plurality of operations, or a result value outputted by the execution of the plurality of operations. The parameter and the result value may be defined as a concept of a specified form (or class). Accordingly to this, the plan may include a plurality of operations identified by a user intention, and a plurality of concepts. The planner module 225 may identify relationships between the plurality of operations and the plurality of concepts stepwise (or hierarchically). For example, the planner module 225 may identify, based on the plurality of concepts, a sequence of execution of the plurality of operations which are identified based on the user intention. In other words, the planner module 225 may identify a sequence of execution of the plurality of operations, based on the parameter necessary for execution of the plurality of operations and the result outputted by execution of the plurality of operations. Accordingly to this, the planner module 225 may generate a plan including association information (e.g., ontology) between the plurality of operations and the plurality of concepts. By using information stored in the capsule database 230 storing a set of relationships of the concepts and the operations, the planner module 225 may generate the plan.

The natural language generator module 227 of an embodiment may alter specified information into a text form. The information altered into the text form may be a form of a natural language utterance. The text to speech module 229 of an embodiment may alter the information of the text form into information of a voice form.

According to an embodiment, a partial function or whole function of a function of the natural language platform 220 may be implemented even in the user terminal 100.

The capsule database 230 may store information about relationships of a plurality of concepts and operations which correspond to a plurality of domains. A capsule of an embodiment may include a plurality of action objects (or action information) and concept objects (or concept information) which are included in a plan. According to an embodiment, the capsule database 230 may store a plurality of capsules in the form of a concept action network (CAN). According to an embodiment, the plurality of capsules may be stored in a function registry included in the capsule database 230.

The capsule database 230 may include a strategy registry of storing strategy information necessary for identifying a plan corresponding to a voice input. The strategy information may include reference information for identifying one plan when there are a plurality of plans corresponding to the voice input. According to an embodiment, the capsule database 230 may include a follow up registry of storing follow-up action information for proposing a follow-up action to a user in a specified situation. The follow-up action may include, for example, a follow-up utterance. According to an embodiment, the capsule database 230 may include a layout registry of storing layout information of information outputted through the user terminal 100. According to an embodiment, the capsule database 230 may include a vocabulary registry of storing vocabulary information included in capsule information. According to an embodiment, the capsule database 230 may include a dialog registry of storing user's dialog (or interaction) information. The capsule database 230 may refine a stored object through a developer tool. The developer tool may, for example, include a function editor for refining an action object or concept object. The developer tool may include a vocabulary editor for refining a vocabulary. The developer tool may include a strategy editor for generating and registering a strategy of identifying a plan. The developer tool may include a dialog editor for generating a dialog with the user. The developer tool may include a follow up editor capable of enabling a follow-up target, and editing a follow-up utterance providing a hint. The follow-up target may be identified based on a currently set target, a user's preference or an environment condition. In an embodiment, the capsule database 230 may be implemented even in the user terminal 100.

The execution engine 240 of an embodiment may provide a result by using the generated plan. The end user interface 250 may send the provided result to the user terminal 100. Accordingly to this, the user terminal 100 may receive the result, and provide the received result to a user. The management platform 260 of an embodiment may manage information used in the intelligence server 200. The big data platform 270 of an embodiment may collect user data. The analytic platform 280 of an embodiment may manage a quality of service (QoS) of the intelligence server 200. For example, the analytic platform 280 may manage a constituent element and processing speed (or efficiency) of the intelligence server 200.

The service server 300 of an embodiment may provide a specified service (e.g., food order or hotel reservation) to the user terminal 100. According to an embodiment, the service server 300 may be a server managed by a third party. The service server 300 of an embodiment may provide information for generating a plan corresponding to a received voice input, to the intelligence server 200. The provided information may be stored in the capsule database 230. Also, the service server 300 may provide information of a result of the plan to the intelligence server 200.

In the above-described integrated intelligence system 10, the user terminal 100 may, in response to a user input, provide various intelligent services to a user. The user input may, for example, include an input through a physical button, a touch input, or a voice input.

In an embodiment, the user terminal 100 may provide a speech recognition service through an intelligence app (or a speech recognition app) stored therein. In this case, for example, the user terminal 100 may recognize a user utterance or voice input received through the microphone, and provide the user with a service corresponding to the recognized voice input.

In an embodiment, the user terminal 100 may perform a specified operation, singly or together with the intelligence server and/or the service server, based on the received voice input. For example, the user terminal 100 may execute an app corresponding to the received voice input, and perform a specified operation through the executed app.

In an embodiment, in response to the user terminal 100 providing a service together with the intelligence server 200 and/or the service server, the user terminal may sense a user utterance by using the microphone 120, and generate a signal (or voice data) corresponding to the sensed user utterance. The user terminal may send the voice data to the intelligence server 200 by using the communication interface 110.

The intelligence server 200 of an embodiment may, as a response to a voice input received from the user terminal 100, generate a plan for performing a task corresponding to the voice input, or a result of performing an operation according to the plan. The plan may include, for example, a plurality of actions for performing a task corresponding to a user's voice input, and a plurality of concepts related to the plurality of actions. The concept may be defined as a parameter inputted for the execution of the plurality of actions, or a result value outputted by the execution of the plurality of actions. The plan may include association information between the plurality of actions and the plurality of concepts.

By using the communication interface 110, the user terminal 100 of an embodiment may receive the response. The user terminal 100 may output a voice signal generated in the user terminal 100 by using the speaker 130, or output an image generated in the user terminal 100 by using the display 140.

Figure 2:
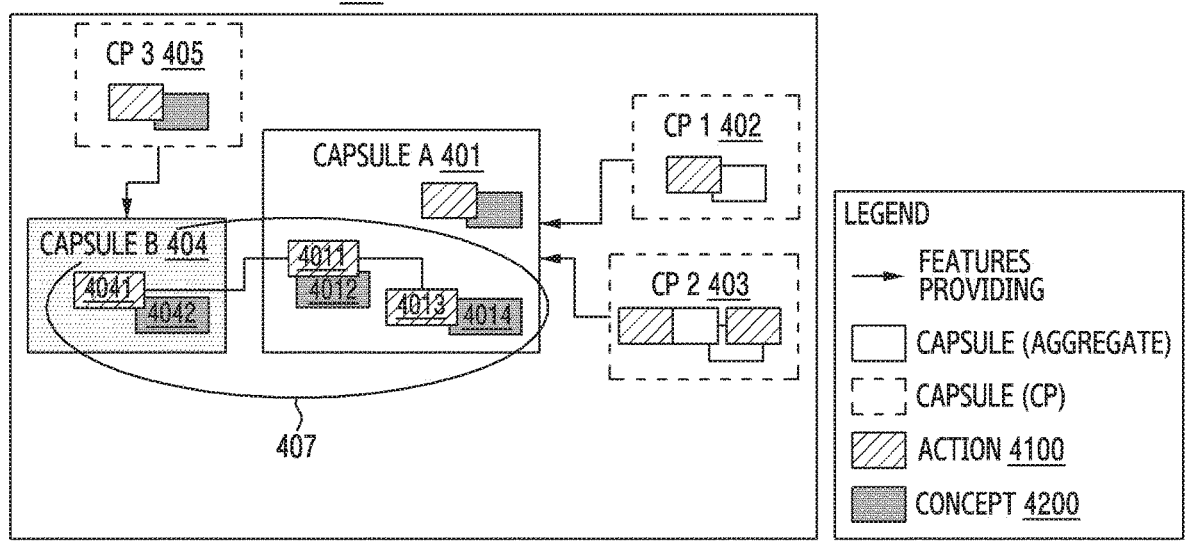
FIG. 2 is a diagram illustrating a form of storing, in a database, relationship information between a concept and an action according to an embodiment of the disclosure.

FIG. 2 is a diagram illustrating a form of storing, in a database, relationship information between a concept and an action according to an embodiment of the disclosure.

A capsule database (e.g., the capsule database 230) of the intelligence server 200 may store a capsule in the form of a concept action network (CAN). The capsule database may store an action for processing a task corresponding to a user's voice input and a parameter necessary for the action, in the form of the concept action network (CAN).

The capsule database may store a plurality of capsules (a capsule A 401 and a capsule B 404) corresponding to a plurality of domains (e.g., applications) respectively. According to an embodiment, one capsule may correspond to one domain (e.g., a location (geographical) application). Also, one capsule may correspond to at least one service provider (or content provider) (e.g., a CP1 402, a CP2 403 or a CP3 405) for performing a function of a domain related to the capsule. According to an embodiment, one capsule may include at least one or more actions 4100 and at least one or more concepts 4200 for performing a specified function.

The natural language platform 220 may generate a plan for performing a task corresponding to a received voice input, by using the capsule stored in the capsule database. For example, the planner module 225 of the natural language platform 220 may generate the plan, by using the capsule stored in the capsule database. For example, the planner module 225 may generate a plan 407, by using actions 4011 and 4013 and concepts 4012 and 4014 of the capsule A 401 and an action 4041 and concept 4042 of the capsule B 404.

Figure 3:
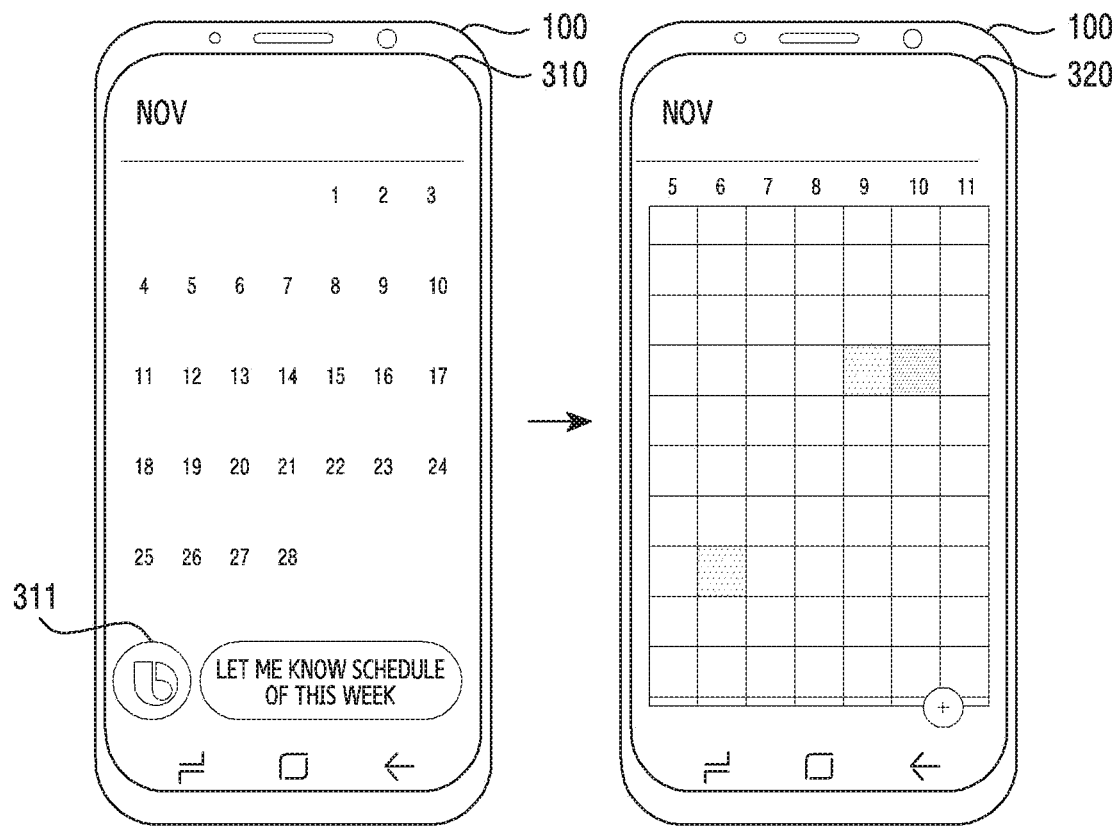
FIG. 3 is a diagram illustrating a user terminal displaying a screen of processing a voice input received through an intelligence app according to an embodiment of the disclosure.

FIG. 3 is a diagram illustrating a screen in which a user terminal processes a received voice input through an intelligence app according to an embodiment of the disclosure.

To process the user input through the intelligence server 200, the user terminal 100 may execute the intelligence app.

Referring to FIG. 3, in screen 310, in response to recognizing a specified voice input (e.g., wake up!) or receiving an input through a hardware key (e.g., a dedicated hardware key), the user terminal 100 may execute the intelligence app for processing the voice input. The user terminal 100 may, for example, execute the intelligence app in a state of executing a schedule app. According to an embodiment, the user terminal 100 may display, on the display 140, an object (e.g., an icon) 311 corresponding to the intelligence app. According to an embodiment, the user terminal 100 may receive a user input by a user utterance. For example, the user terminal 100 may receive a voice input "Let me know a schedule of this week!". According to an embodiment, the user terminal 100 may display, on the display, a user interface (UI) 313 (e.g., an input window) of the intelligence app displaying text data of the received voice input.

According to an embodiment, in screen 320, the user terminal 100 may display a result corresponding to the received voice input on the display. For example, the user terminal 100 may receive a plan corresponding to the received user input, and display the 'schedule of this week' according to the plan, on the display.

Figure 4:
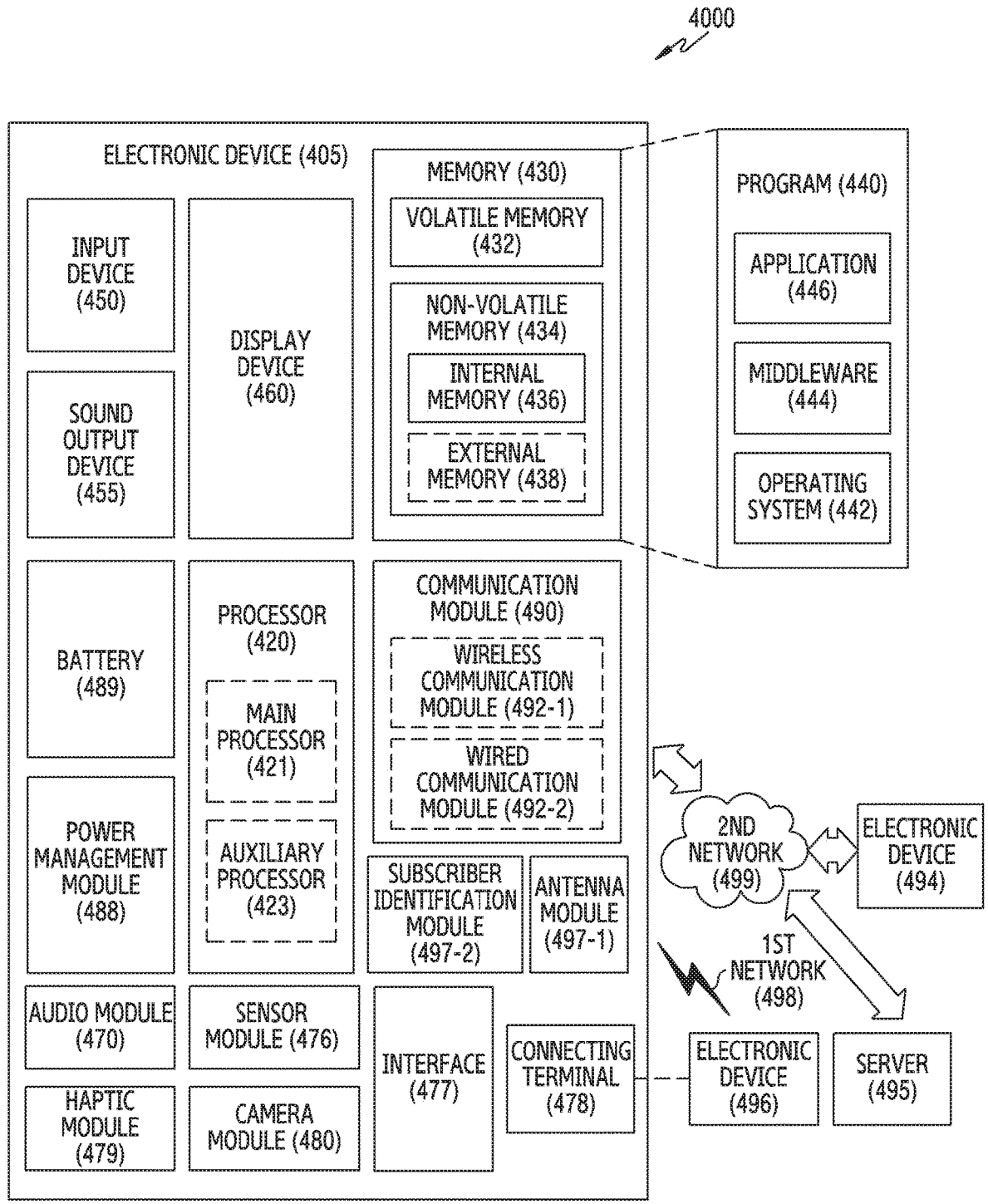
FIG. 4 is a block diagram of an electronic device within a network environment according to an embodiment of the disclosure.

FIG. 4 is a block diagram illustrating an electronic device 405 in a network environment 4000 according to an embodiment of the disclosure.

Referring to FIG. 4, the electronic device 405 in the network environment 4000 may communicate with an electronic device 496 via a first network 498 (e.g., a short-range wireless communication network), or an electronic device 494 or a server 495 via a second network 499 (e.g., a long-range wireless communication network). According to an embodiment, the electronic device 405 may communicate with the electronic device 494 via the server 495. According to an embodiment, the electronic device 405 may include a processor 420, memory 430, an input device 450, a sound output device 455, a display device 460, an audio module 470, a sensor module 476, an interface 477, a haptic module 479, a camera module 480, a power management module 488, a battery 489, a communication module 490, a subscriber identification module (SIM) 497-2, or an antenna module 497-1. In some embodiments, at least one (e.g., the display device 460 or the camera module 480) of the components may be omitted from the electronic device 405, or one or more other components may be added in the electronic device 405. In some embodiments, some of the components may be implemented as single integrated circuitry. For example, the sensor module 476 (e.g., a fingerprint sensor, an iris sensor, or an illuminance sensor) may be implemented as embedded in the display device 460 (e.g., a display).

The processor 420 may execute, for example, software (e.g., a program 440) to control at least one other component (e.g., a hardware or software component) of the electronic device 405 coupled with the processor 420, and may perform various data processing or computation. According to one embodiment, as at least part of the data processing or computation, the processor 420 may load a command or data received from another component (e.g., the sensor module 476 or the communication module 490) in volatile memory 432, process the command or the data stored in the volatile memory 432, and store resulting data in non-volatile memory 434. According to an embodiment, the processor 420 may include a main processor 421 (e.g., a central processing unit (CPU) or an application processor (AP)), and an auxiliary processor 423 (e.g., a graphics processing unit (GPU), an image signal processor (ISP), a sensor hub processor, or a communication processor (CP)) that is operable independently from, or in conjunction with, the main processor 421. Additionally or alternatively, the auxiliary processor 423 may be adapted to consume less power than the main processor 421, or to be specific to a specified function. The auxiliary processor 423 may be implemented as separate from, or as part of the main processor 421.

The auxiliary processor 423 may control at least some of functions or states related to at least one component (e.g., the display device 460, the sensor module 476, or the communication module 490) among the components of the electronic device 405, instead of the main processor 421 while the main processor 421 is in an inactive (e.g., sleep) state, or together with the main processor 421 while the main processor 421 is in an active state (e.g., executing an application). According to an embodiment, the auxiliary processor 423 (e.g., an image signal processor or a communication processor) may be implemented as part of another component (e.g., the camera module 480 or the communication module 490) functionally related to the auxiliary processor 423.

The memory 430 may store various data used by at least one component (e.g., the processor 420 or the sensor module 476) of the electronic device 405. The various data may include, for example, software (e.g., the program 440) and input data or output data for a command related thereto. The memory 430 may include the volatile memory 432 or the non-volatile memory 434.

The program 440 may be stored in the memory 430 as software, and may include, for example, an operating system (OS) 442, middleware 444, or an application 446.

The input device 450 may receive a command or data to be used by other component (e.g., the processor 420) of the electronic device 405, from the outside (e.g., a user) of the electronic device 405. The input device 450 may include, for example, a microphone, a mouse, a keyboard, or a digital pen (e.g., a stylus pen).

The sound output device 455 may output sound signals to the outside of the electronic device 405. The sound output device 455 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 460 may visually provide information to the outside (e.g., a user) of the electronic device 405. The display device 460 may include, for example, a display, a hologram device, or a projector and control circuitry to control a corresponding one of the display, hologram device, and projector. According to an embodiment, the display device 460 may include touch circuitry adapted to detect a touch, or sensor circuitry (e.g., a pressure sensor) adapted to measure the intensity of force incurred by the touch.

The audio module 470 may convert a sound into an electrical signal and vice versa. According to an embodiment, the audio module 470 may obtain the sound via the input device 450, or output the sound via the sound output device 455 or a headphone of an external electronic device (e.g., an electronic device 496) directly (e.g., wiredly) or wirelessly coupled with the electronic device 405.

The sensor module 476 may detect an operational state (e.g., power or temperature) of the electronic device 405 or an environmental state (e.g., a state of a user) external to the electronic device 405, and then generate an electrical signal or data value corresponding to the detected state. According to an embodiment, the sensor module 476 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 477 may support one or more specified protocols to be used for the electronic device 405 to be coupled with the external electronic device (e.g., the electronic device 496) directly (e.g., wiredly) or wirelessly. According to an embodiment, the interface 477 may include, for example, a high definition multimedia interface (HDMI), a universal serial bus (USB) interface, a secure digital (SD) card interface, or an audio interface.

A connecting terminal 478 may include a connector via which the electronic device 405 may be physically connected with the external electronic device (e.g., the electronic device 496). According to an embodiment, the connecting terminal 478 may include, for example, a HDMI connector, a USB connector, a SD card connector, or an audio connector (e.g., a headphone connector).

The haptic module 479 may convert an electrical signal into a mechanical stimulus (e.g., a vibration or a movement) or electrical stimulus which may be recognized by a user via his tactile sensation or kinesthetic sensation. According to an embodiment, the haptic module 479 may include, for example, a motor, a piezoelectric element, or an electric stimulator.

The camera module 480 may capture a still image or moving images. According to an embodiment, the camera module 480 may include one or more lenses, image sensors, image signal processors, or flashes.

The power management module 488 may manage power supplied to the electronic device 405. According to one embodiment, the power management module 488 may be implemented as at least part of, for example, a power management integrated circuit (PMIC).

The battery 489 may supply power to at least one component of the electronic device 405. According to an embodiment, the battery 489 may include, for example, a primary cell which is not rechargeable, a secondary cell which is rechargeable, or a fuel cell.

The communication module 490 may support establishing a direct (e.g., wired) communication channel or a wireless communication channel between the electronic device 405 and the external electronic device (e.g., the electronic device 496, the electronic device 494, or the server 495) and performing communication via the established communication channel. The communication module 490 may include one or more communication processors that are operable independently from the processor 420 (e.g., the application processor (AP)) and supports a direct (e.g., wired) communication or a wireless communication. According to an embodiment, the communication module 490 may include a wireless communication module 492-1 (e.g., a cellular communication module, a short-range wireless communication module, or a global navigation satellite system (GNSS) communication module) or a wired communication module 492-2 (e.g., a local area network (LAN) communication module or a power line communication (PLC) module). A corresponding one of these communication modules may communicate with the external electronic device via the first network 498 (e.g., a short-range communication network, such as Bluetooth™, wireless-fidelity (Wi-Fi) direct, or infrared data association (IrDA)) or the second network 499 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 492-1 may identify and authenticate the electronic device 405 in a communication network, such as the first network 498 or the second network 499, using subscriber information (e.g., international mobile subscriber identity (IMSI)) stored in the subscriber identification module 497-2.

The antenna module 497-1 may transmit or receive a signal or power to or from the outside (e.g., the external electronic device) of the electronic device 405. According to an embodiment, the antenna module 497-1 may include a plurality of antennas. In such a case, at least one antenna appropriate for a communication scheme used in the communication network, such as the first network 498 or the second network 499, may be selected, for example, by the communication module 490 (e.g., the wireless communication module 492-1) from the plurality of antennas. The signal or the power may then be transmitted or received between the communication module 490 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 405 and the external electronic device 494 via the server 495 coupled with the second network 499. Each of the electronic devices 496 and 494 may be a device of a same type as, or a different type, from the electronic device 405. According to an embodiment, all or some of operations to be executed at the electronic device 405 may be executed at one or more of the external electronic devices 496, 494, or 495. For example, if the electronic device 405 should perform a function or a service automatically, or in response to a request from a user or another device, the electronic device 405, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 405. The electronic device 405 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 440) including one or more instructions that are stored in a storage medium (e.g., internal memory 436 or external memory 438) that is readable by a machine (e.g., the electronic device 405). For example, a processor (e.g., the processor 420) of the machine (e.g., the electronic device 405) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 5:
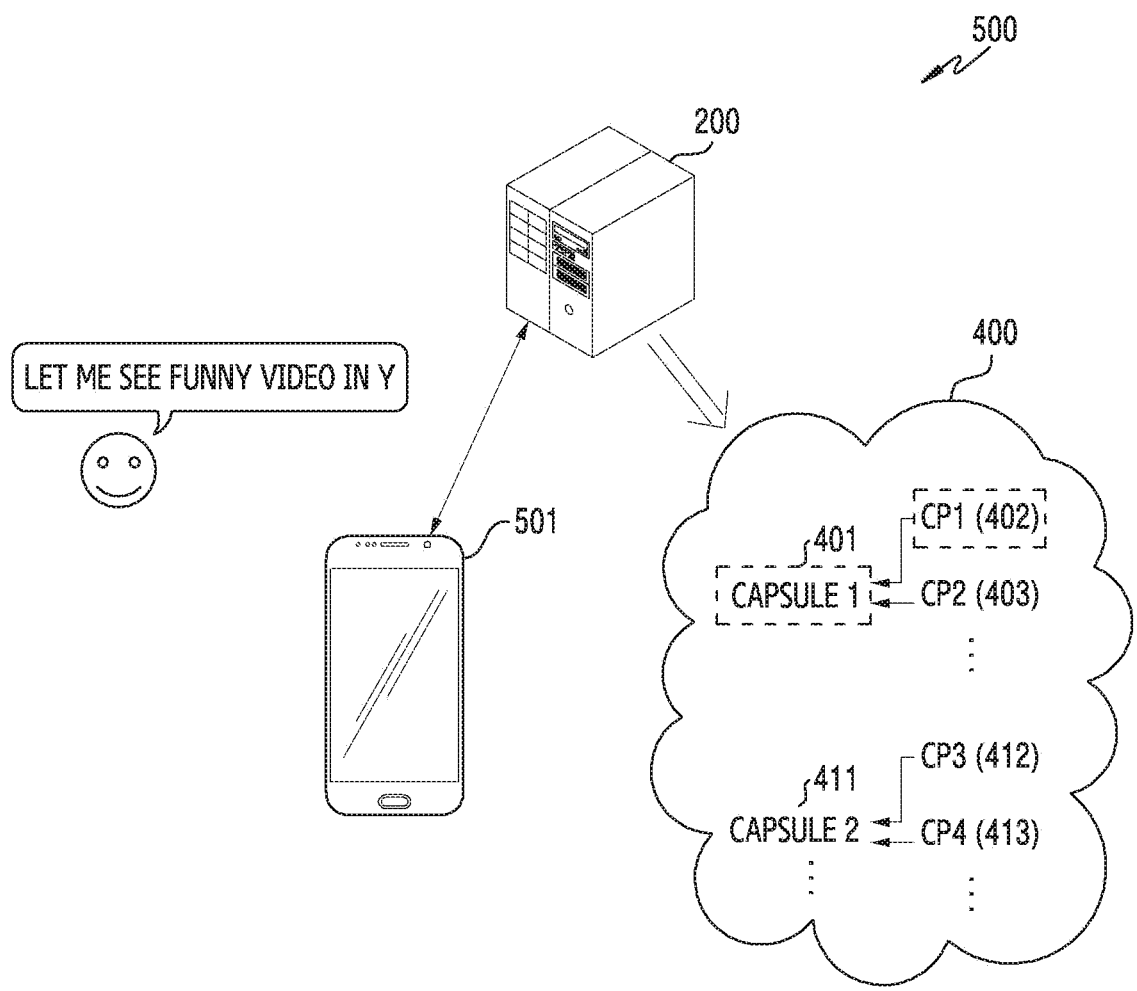
FIGS. 5 and 6 are diagrams for explaining a speech recognition system according to various embodiments of the disclosure.

FIG. 5 is a diagram for explaining a speech recognition system according to an embodiment of the disclosure.

Referring to FIG. 5, the speech recognition system 500 may include an electronic device 501, the intelligence server 200, and the concept action network 400.

In an embodiment, the electronic device 501 may correspond to the user terminal 100 disclosed in FIG. 1, or correspond to the electronic device 405 disclosed in FIG. 4.

In an embodiment, the electronic device 501 may be a device for, in response to the receiving of a user utterance, providing at least one service to a user. For example, in response to the receiving of the user utterance, the electronic device 501 may perform data communication with an external device (e.g., the intelligence server 200), and provide at least one service to the user, based on data received from the external device. The data the electronic device 501 receives from the external device may be data which is generated in the external device based on an ontology network (e.g., the concept action network 400) and user utterance data.

In an embodiment, the electronic device 501 may receive a user utterance. The electronic device 501 may receive the user utterance through a microphone (e.g., the microphone 120 of FIG. 1). In an embodiment, the user utterance may be an utterance including a specific service provider (or content provider). In an embodiment, the user utterance may be an utterance including the specific service provider, and requesting content or suggesting a request for content. For example, the electronic device 501 may receive a user utterance such as "Let me see a funny video in Y". For example, the 'Y' may be an Internet based video steaming platform.

In an embodiment, the electronic device 501 receiving the user utterance may perform data communication with an external device (e.g., the intelligence server 200). For example, the electronic device 501 may transmit voice data of the received user utterance to the intelligence server 200, and may receive a plan corresponding to the received user utterance, from the intelligence server 200.

In an embodiment, the electronic device 501 receiving the plan corresponding to the user utterance may provide at least one service to a user, based on the received plan. For example, the electronic device 501 may reproduce and display at least one video which is uploaded (or posted) to the video streaming platform Y.

In an embodiment, the intelligence server 200 disclosed in FIG. 5 may correspond to the intelligence server 200 disclosed in FIG. 1. By using user utterance voice data received from the electronic device 501, the intelligence server 200 may generate a plan corresponding to a user utterance, and transmit the generated plan to the electronic device 501. For example, the intelligence server 200 may transmit, to the electronic device 501, information (e.g., data about the at least one video and information about a series of operation sequences) necessary for reproducing at least one video through the platform Y in the electronic device 501.

In an embodiment, the intelligence server 200 may generate a plan corresponding to a user utterance, based on the concept action network 400. In an embodiment, the intelligence server 200 may identify at least one capsule (or domain) in the concept action network 400, based on the text of the user utterance. For example, the intelligence server 200 may identify a capsule 1 401 corresponding to "video reproduction" in the concept action network 400, based on the text of the user utterance. For another example, the intelligence server 200 may identify a capsule 2 411 corresponding to "comics", based on the text of the user utterance. In an embodiment, the intelligence server 200 may identify at least one service provider corresponding to the identified capsule, or identify some of the at least one service provider corresponding to the identified capsule. For example, the intelligence server 200 may identify some (CP1 402) of the at least one service provider (CP1 402 and CP2 403) corresponding to the identified capsule (capsule 1 401). The CP1 402 and the CP2 403 may correspond to the same capsule 1 401, and be distinguished from each other. For example, the CP1 402 may correspond to the video streaming platform Y, and the CP2 403 may correspond to a video streaming platform Z.

In accordance with an embodiment disclosed in FIG. 5, the electronic device 501 receiving a user utterance may provide at least one service associated with the user utterance, to a user (for example, may provide the at least one service to the user based on the capsule 1 401 and CP1 402) indicated by a dotted line in FIG. 5). However, in response to receiving a user utterance not expressly including a 3rd party service provider, not a user utterance expressly including the 3rd party service provider, the electronic device 501 may provide a service a little going against a user intention. For example, in response to a user uttering a text such as "Let me see a funny video" with intending the video streaming platform Y, the electronic device 501 may reproduce and display at least one video which is uploaded to the video streaming platform Z as well.

Figure 6:
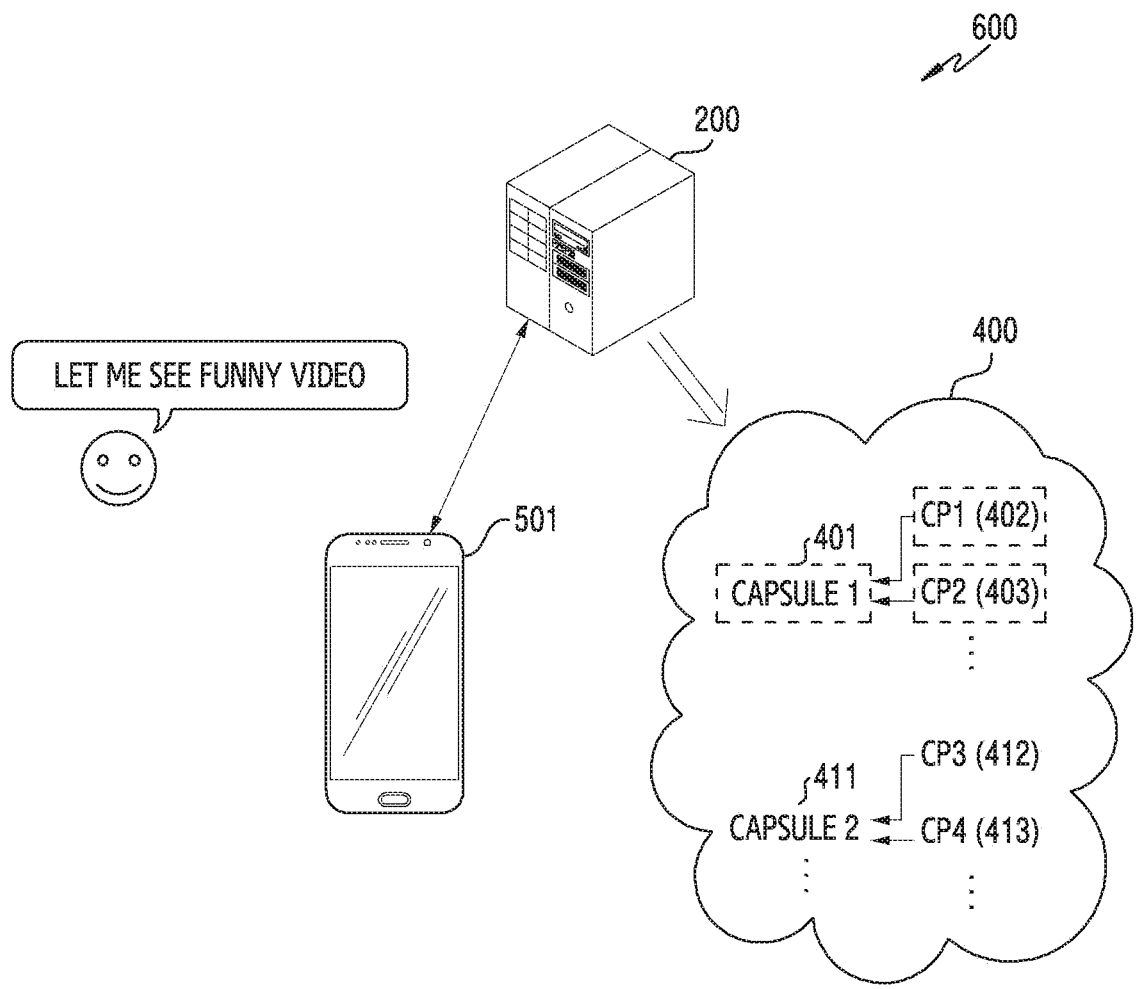

FIG. 6 is a diagram for explaining a speech recognition system according to an embodiment of the disclosure.

Referring to FIG. 6, the speech recognition system 600 may include the electronic device 501, the intelligence server 200, and the concept action network 400.

In an embodiment, unlike FIG. 5, the electronic device 501 may receive a user utterance such as "Let me see a funny video". The user utterance of FIG. 6 may be distinguished from the user utterance of FIG. 5, in that the user utterance does not expressly include a service provider providing a video reproduction service.

In an embodiment, when generating a plan corresponding to a user utterance, the intelligence server 200 disclosed in FIG. 6 may identify at least one capsule in the concept action network 400, based on user profile information, or identify some of at least one service provider corresponding to the identified capsule, based on the user profile information. The intelligence server 200 may receive identification information of the electronic device or account information of a user, together with user utterance data. The intelligence server 200 may obtain the user profile information by using the received identification information or account information. For example, the intelligence server 200 may identify the capsule 1 401 corresponding to "video reproduction" in the concept action network 400, based on the text of the user utterance, and may identify some (CP1 402) of at least one service provider (CP1 402 and CP2 403) corresponding to the "video reproduction" capsule 1 401, based on the user profile information. The intelligence server 200 may generate a plan corresponding to the user utterance, based on at least one of the identified capsule or the identified service provider, and transmit the generated plan to the electronic device 501. Based on the transmitted plan, the electronic device 501 may reproduce and display at least one video which is uploaded (or posted) to the video streaming platform Y.

In an embodiment, the intelligence server 200 disclosed in FIG. 6 may identify (or alter) a setting value related to processing of a user utterance that will be inputted later. While the electronic device 501 provides at least one service associated with the user utterance to a user, the intelligence server 200 may identify (or alter) a setting value related to processing of a user utterance that will be inputted later, based on a user input inputted to the electronic device 501. The setting value may be specified each differently according to a specific 3rd party service provider. For example, while the electronic device 501 provides a service related to the CP1 402 (e.g., the video streaming platform Y) to the user, the intelligence server 200 may identify a setting value of the CP1 402, based on a user input inputted to the electronic device 501. For detailed example, while the electronic device 501 provides the service related to the CP 402 to the electronic device 501, the intelligence server 200 may identify the setting value of the CP1 402 as "enabled", based on a user input for enabling the service related to the CP1 402. When the setting value of the CP1 402 is identified as "enabled", the intelligence server 200 may, in response to a user utterance not expressly including a specific service provider later, generate a plan corresponding to the user utterance based on the CP1 402. The intelligence server 200 may transmit the generated plan to the electronic device 501, and provide the service related to the CP1 402, based on the transmitted plan. The electronic device 501 may, for example, reproduce and display at least one video which is uploaded (or posted) to the video streaming platform Y.

Figure 7:
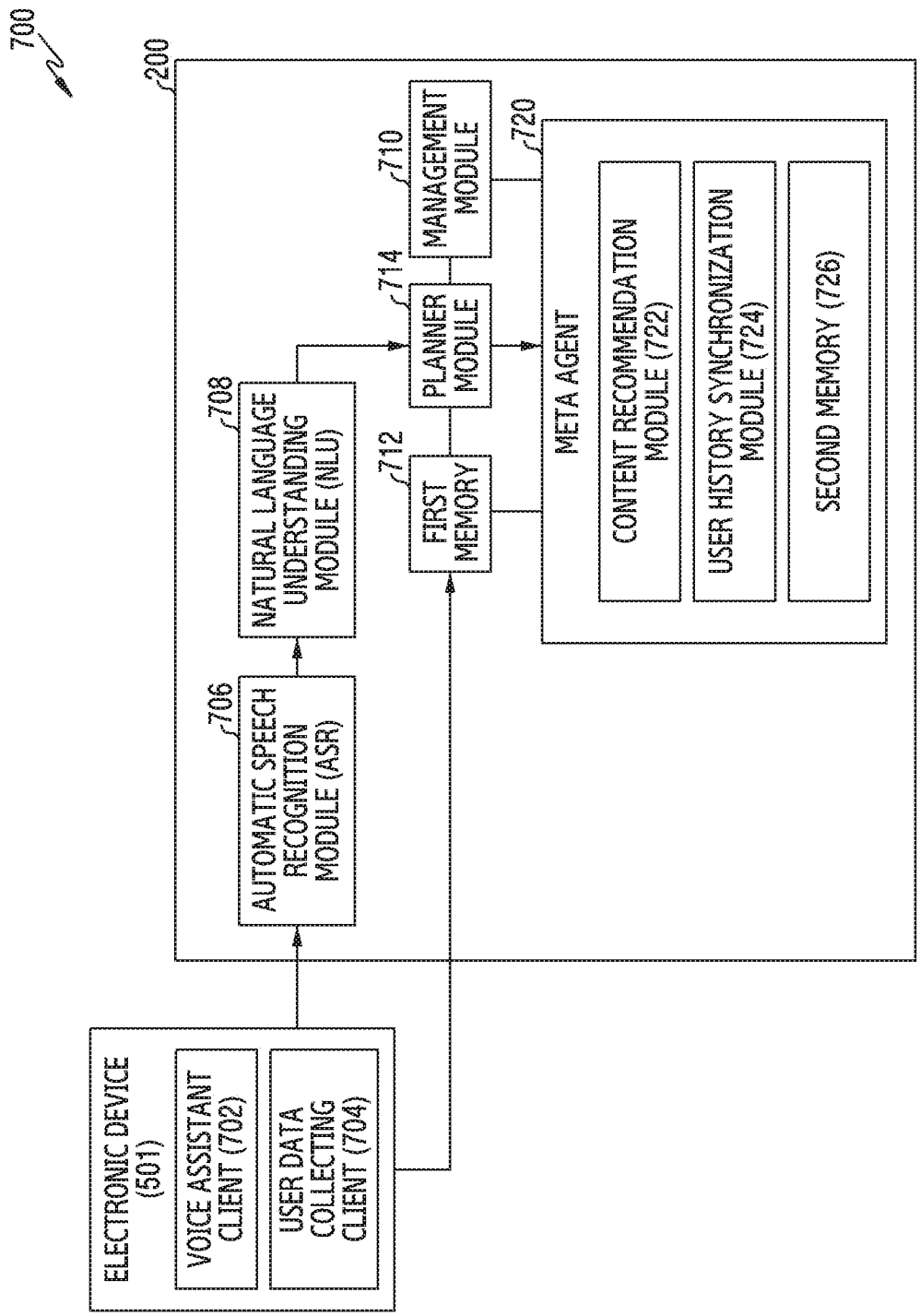
FIG. 7 is a block diagram of a speech recognition system according to an embodiment of the disclosure.

FIG. 7 is a block diagram of a speech recognition system according to an embodiment of the disclosure.

Referring to FIG. 7, the speech recognition system 700 may include the electronic device 501 and the intelligence server 200. The speech recognition system 700 disclosed in FIG. 7 may correspond to the speech recognition system 500 disclosed in FIG. 5 or the speech recognition system 600 disclosed in FIG. 6. The electronic device 501 disclosed in FIG. 7 may correspond to the electronic device 501 disclosed in FIG. 5 or FIG. 6, and the intelligence server 200 disclosed in FIG. 7 may correspond to the intelligence server 200 disclosed in FIG. 5 or FIG. 6.

In an embodiment, the electronic device 501 may include a voice assistant client 702 and a user data collecting client 704. For example, the voice assistant client 702 and the user data collecting client 704 may be part of the client module 151 disclosed in FIG. 1. In an embodiment, the voice assistant client 702 and the user data collecting client 704 may be operated by the execution (or control) of the processor 160 disclosed in FIG. 1.

In an embodiment, the voice assistant client 702 may control interaction with the speech recognition system 700 and a user. For example, the voice assistant client 702 may receive a user utterance (e.g., "Let me see a funny video"). The voice assistant client 702 may receive a voice signal corresponding to a user utterance sensed through a microphone (e.g., the microphone 120 of FIG. 1), and may transmit the received voice signal to the intelligence server 200. For another example, the voice assistant client 702 may provide at least one service in response to receiving of a user's voice input. For example, the voice assistant client 702 may control a display (e.g., the display 140 of FIG. 1) to reproduce and display at least one video which is uploaded to a video streaming platform Y.

In an embodiment, the user data collecting client 704 may collect (or obtain) user data. The user data collecting client 704 may collect user data corresponding to a time duration during which the voice assistant client 702 is enabled. For example, the user data collecting client 704 may obtain user account data for using or accessing the speech recognition system 700, a name of at least one service provided to a user or a name of concrete content, the number of requests when a user additionally requests related other contents, and/or data about a requesting time. The user data collecting client 704 may transmit the obtained user data to the intelligence server 200. The intelligence server 200 may store the obtained user data in a first memory 712, and may process the obtained user data as well. For example, based on the obtained user data, the intelligence server 200 may generate data about a user preference for at least one CP (CP1 402 or CP2 403) corresponding to a specific capsule (e.g., the capsule 1 401 corresponding to video reproduction).

In an embodiment, the intelligence server 200 may include an automatic speech recognition module 706, a natural language understanding module 708, a management module 710, the first memory 712, and/or a meta agent 720.

In an embodiment, the automatic speech recognition module 706 may correspond to the automatic speech recognition module 221 disclosed in FIG. 1. For example, the automatic speech recognition module 706 may convert a voice input ("Let me see a funny video") received from the electronic device 501, into text data.

In an embodiment, the natural language understanding module 708 may correspond to the natural language understanding module 223 disclosed in FIG. 1. For example, the natural language understanding module 708 may perform syntactic analysis or semantic analysis, to identify a user intention ("video reproduction") and a parameter ("funny video") associated with the intention. For another example, the natural language understanding module 708 may perform the syntactic analysis or the semantic analysis, to identify a service provider capable of providing a service corresponding to the user intention (e.g., "Y" in a user utterance such as "Let me see a funny video in Y"). The natural language understanding module 708 may identify whether a specific service provider is included in the user utterance. The operation of identifying whether the specific service provider is included in the user utterance may be implemented by the planner module 714, not the natural language understanding module 708 as well.

In an embodiment, the planner module 714 may correspond to the planner module 225 disclosed in FIG. 1. For example, the planner module 714 may generate a plan that will be provided to the electronic device 501 by using the intention and parameter identified in the natural language understanding module 708.

In an embodiment, the planner module 714 may identify at least one capsule for processing a task corresponding to a user utterance, based on received user utterance data. For example, the planner module 714 may identify the capsule 1 401 corresponding to "video reproduction", based on the text of a user utterance such as "Let me see a funny video". The operation of identifying at least one capsule based on the user utterance data may be implemented by the natural language understanding module 708, not the planner module 714 as well.

In an embodiment, in response to a specific service provider being included in a user utterance, the planner module 714 may generate a plan that will be transmitted to the electronic device 501, based on the specific service provider. For example, in response to a user utterance such as "Let me see a funny video in Y", the planner module 714 may generate a plan that will be transmitted to the electronic device 501, based on the capsule 1 401 and the CP1 402 which means the video streaming platform Y.

In another embodiment, in response to the specific service provider not being included in the user utterance, and there being at least one CP set as "enabled", the planner module 714 may generate a plan that will be transmitted to the electronic device 501, based on the at least one CP set as "enabled". For example, in response to the user utterance not specifying the specific service provider such as "Let me see the comics I have seen last time", the planner module 714 may generate the plan, based on the CP3 412 set as "enabled".

In an embodiment, the planner module 714 may generate the plan, by using user history data. In an embodiment, the planner module 714 may generate the plan, by using the user history data stored in the first memory 712. The user history data stored in the first memory 712 may include information of content consumed by a user through the meta agent 720 or information of content consumed by the user without going through the meta agent 720.

For example, in response to a user having seen episode 1 to episode 3 of a comics D provided in a comics platform C through the meta agent 720, and this information having been stored in the first memory 712, the planner module 714 may generate the plan by using the information. That is, the planner module 714 may generate the plan based on the CP3 412 representing the comics platform C, but generate the plan wherein the user can be provided with episode 4 of the comics D.

In an embodiment, in response to a specific service provider not being included in a user utterance, and there not being at least one CP set as "enabled", the planner module 714 may transmit related data to the meta agent 720.

In an embodiment, the meta agent 720 may process a user utterance not expressly including a specific service provider in a state where there is not at least one CP set as "enabled". For example, in response to it being identified that a capsule for processing a task corresponding to a user utterance is the capsule 2 411 in accordance with a text of the user utterance, the meta agent 720 may process a user utterance in which at least one CP set as "enabled" does not exist among CPs (CP3 412 and CP4 413) corresponding to the identified capsule 2 411 and which does not expressly include the specific service provider as well. Similarly with the planner module 714, the meta agent 720 may generate a plan corresponding to the user utterance and transmit the same to the electronic device 501.

In an embodiment, the meta agent 720 may include a content recommendation module 722, a user history synchronization module 724, and/or a second memory 726.

In an embodiment, the meta agent 720 may be a kind of capsule which selectively receives user utterance data from the planner module 714 or the natural language understanding module 708.

In an embodiment, the meta agent 720 may receive, from the planner module 714 or the natural language understanding module 708, user utterance data in which a specific service provider is not included, and in which at least one CP set as "enabled" does not exist. In another embodiment, the meta agent 720 may receive, from the natural language understanding module 708, user utterance data in which a specific service provider is not included, and in which at least one CP set as "enabled" does not exist, and which requests or suggests the provision of content. For example, the meta agent 720 may receive user utterance data such as "Let me see a funny video".

In an embodiment, the meta agent 720 (or the content recommendation module 722) may identify data (or content) which is associated with a user utterance and which will be recommended to a user, by using received user utterance data. The content recommendation module 722 may additionally use information about an identified capsule (e.g., the capsule 1 401), based on the text of the user utterance.

In an embodiment, the content recommendation module 722 may identify one CP among at least one CP corresponding to the identified capsule. For example, the content recommendation module 722 may identify one CP (e.g., CP1 402) among at least one CP (CP1 402 (e.g., video streaming platform Y) and CP2 403 (e.g., video streaming platform Z)) corresponding to the identified "video reproduction" capsule 1 401. In an embodiment, the content recommendation module 722 may identify one CP among at least one CP corresponding to the identified capsule, based on a user profile. For example, the content recommendation module 722 may obtain information about the user profile such as a gender of a user, an age, a current location, a current time, etc. from the first memory 712, and may identify one CP among at least one CP corresponding to the identified capsule, based on the obtained information.

In an embodiment, the content recommendation module 722 may identify at least one content among a plurality of contents which can be provided to a user through the identified CP. In an embodiment, the content recommendation module 722 may identify the at least one content among the plurality of contents, based on a user profile (e.g., a user's age). For example, the content recommendation module 722 may identify at least one video which is uploaded (or posted) to the CP1 402 (video streaming platform Y) that is the identified CP.

In an embodiment, the content recommendation module 722 may store, in the second memory 726, information about content consumed by a user through the meta agent 720. For example, in response to a user seeing a highlight video of episode 20 of an entertainment program J which is uploaded to the video streaming platform Y through a recommendation of the content recommendation module 722, the content recommendation module 722 may store this information in the second memory 726.

In an embodiment, the user history synchronization module 724 may synchronize user history data. In response to a user receiving a service provided by the same CP (e.g., CP3 412) through mutually different paths, the user history synchronization module 724 may synchronize each history data.

For example, when the planner module 714 generates a plan related to a comics D which is uploaded to a comics platform C and transmits the same to the electronic device 501 in response to a user utterance including a specific service provider such as "I want to see a comics D", and the user sees episode 1 to episode 3 of the comics D in response to this, the user history synchronization module 724 may receive, from the first memory 712, information that the user sees episode 1 to episode 3 of the comics D without going through the meta agent 720, and store the same in the second memory 726. For another example, when the content recommendation module 722 recommends the comics D among a plurality of comics which are uploaded to the comics platform C in response to a user utterance such as "I'm bored. What is anything funny?", and the user sees episode 4 of the comics D in response to the recommendation, the user history synchronization module 724 may transmit, to the first memory 712, information that the user sees episode 4 of the comics D through the meta agent 720. The information may be stored in a region corresponding to the CP3 412 corresponding to the comics platform C, in a CP database (not shown) of the first memory 712.

In an embodiment, the second memory 726 may store data related to the meta agent 720.

For example, the second memory 726 may store information of content consumed by a user through the meta agent 720.

For another example, the second memory 726 may store information of content consumed by a user through a path unrelated to the meta agent 720. That is, the second memory 726 may store synchronized user history data, by using the information of the content consumed by the user through the meta agent 720 and the information of the content consumed by the user through the path unrelated to the meta agent 720.

For further example, the second memory 726 may store at least one content. The second memory 726 may store at least one content received from at least one CP. The second memory 726 may receive at least one sample content (e.g., a preview) from at least one CP. For example, the meta agent 720 may receive, as sample content, content of episode 1 of the comics D consisting of a total of twenty episodes, from the CP3 412 indicating the comics platform C, and store the received content in the second memory 726.

In an embodiment, the management module 710 may manage at least one capsule (e.g., the capsule 1 401) and at least one CP (e.g., CP1 402 or the CP2 403) which are included in a concept action network (e.g., the concept action network 400 of FIG. 5). The management module 710 may manage at least one capsule and at least one CP, which are different according to a user (or an electronic device). For example, the management module 710 may manage a list of CPs related to a service which is at least once provided to the user, the number of provision of services related to each CP, a list of CPs whose setting values are set as "enabled" among CPs related to a service which is at least once provided to the user, a list of CPs whose setting values are set as "enabled" based on a user input among the CPs whose setting values are set as "enabled", and/or a list of CPs whose setting values are set as "enabled" unrelated to a user input among the CPs whose setting values are set as "enabled".

In an embodiment, the first memory 712 may store data related to the intelligence server 200. The first memory 712 may store data related to the intelligence server 200 and unrelated to the meta agent 720.

For example, the first memory 712 may include a CP database. The CP database may correspond to the capsule database 230 disclosed in FIG. 1, or may be configured separately from the capsule database 230. In an embodiment, the CP database may store at least one CP corresponding to each of a plurality of capsules. The CP database may store at least one CP in the form of a CAN. According to an embodiment, the at least one CP may be stored in a function registry included in the CP database. In an embodiment, the CP database may store information about a value set to the at least one CP. For example, the at least one CP may be set as a "disabled" value being a default, and the setting value may be altered into an "enabled" value, based on a user input. For another example, the setting value of the CP set as the "enabled" value may be altered into the "disabled" value, based on a user input. For further example, the setting value may be altered from "enabled" to "disabled", or from "disabled" to "enabled", even without the user input, under the control of the meta agent 720.

A value set to the at least one CP may be a value related to processing of a user utterance that will be inputted later. For example, in response to the "enabled" value being set to the CP1 402 corresponding to the "video reproduction" capsule 1 401, even though a user does not say a user utterance expressly specifying or including the CP1 402 later, the intelligence server 200 may generate a plan that will be provided to the user, based on the CP1 402.

In an embodiment, the CP database may store user history data. In response to a user receiving a service provided by a specific CP through mutually different paths, the CP database may each store each history data. For example, in response to the user receiving the service provided by the specific CP by a recommendation of the content recommendation module 722 responding to a user utterance not specifying the specific CP, the CP database may store information about the text of the user utterance, a service provision time, and/or the substance (e.g., content) of the provided service. For another example, in response to the user receiving the service provided by the specific CP by a response of the planner module 714 responding to a user utterance specifying or including the specific CP, the CP database may store information about the text of the user utterance, a service provision time, and/or the substance (e.g., content) of the provided service.

In an embodiment, in response to the user receiving a service provided by a specific CP through mutually different paths, the CP database may integrate and store each history data. For example, in response to after seeing episode 1 to episode 3 of a comics D of the CP3 412 by a recommendation of the content recommendation module 722 responding to a user utterance not specifying a specific CP, the user seeing episode 4 of the comics of the CP3 412 by a response of the planner module 714 responding to a user utterance specifying the specific CP, the CP database may store information that the user has seen episode 1 to episode 4 of the CP3 412.

Figure 8:
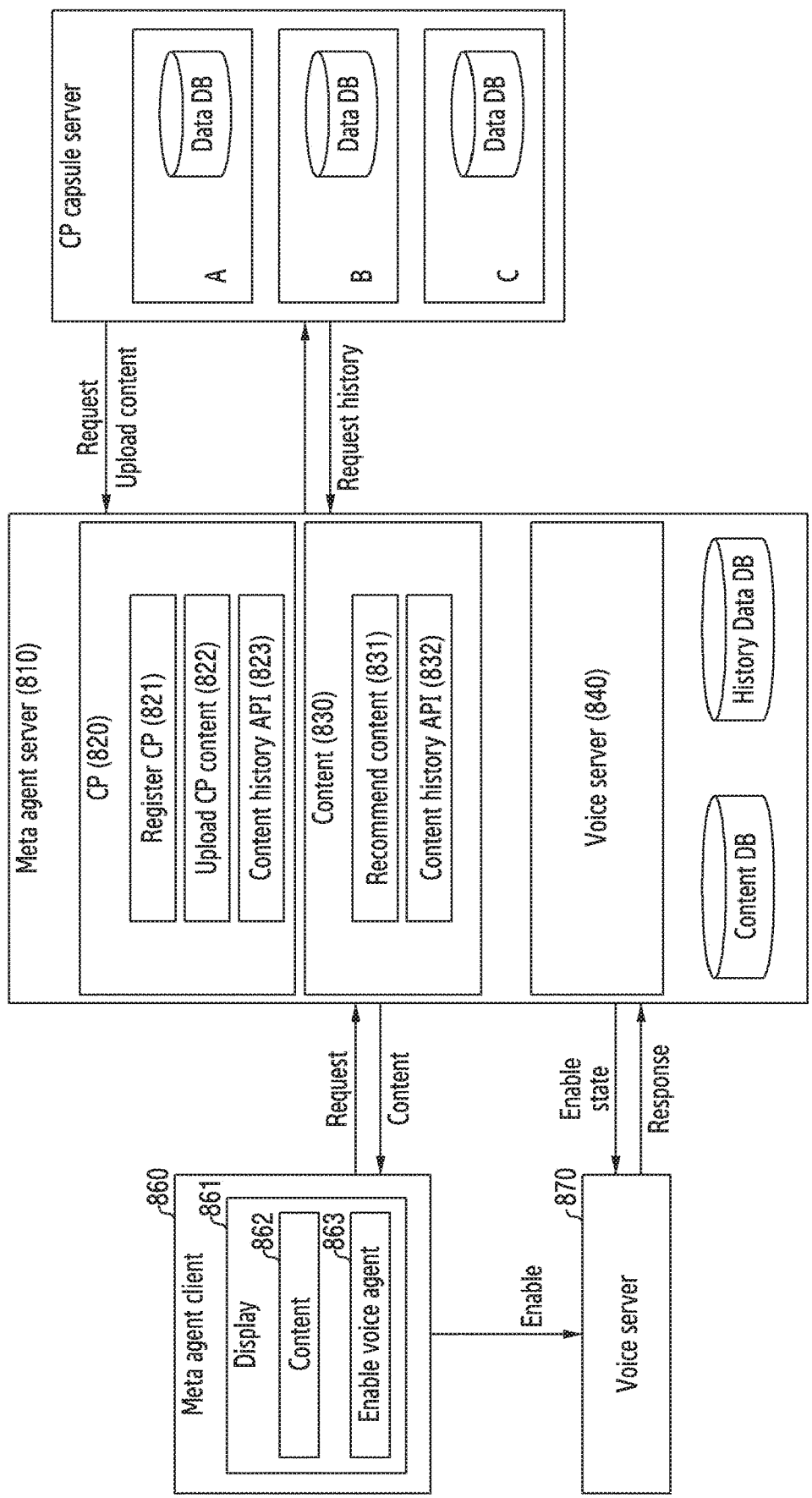
FIG. 8 is a diagram for explaining a speech recognition system based on a server structure according to an embodiment of the disclosure.

FIG. 8 is a diagram for explaining a speech recognition system based on a server structure according to an embodiment of the disclosure.

Referring to FIG. 8, a meta agent server 810 may be a server for implementing the meta agent 720 disclosed in FIG. 7.

In an embodiment, the meta agent server 810 may be divided into a plurality of regions or domains according to an operation carried out. For example, the meta agent server 810 may be divided into a CP region 820, a content region (content) 830, and/or a voice server region (voice server) 840.

In an embodiment, the CP region 820 may be divided into a CP register region (register CP) 821 for registering at least one CP to the meta agent server 810, a CP content upload region (upload CP content) 822 for receiving the uploading of content from the registered at least one CP, and/or a content history region (content history) 823 for managing or synchronizing a history of content consumed by a user. At least one of the CP register region 821, the CP content upload region 822, and/or the content history region 823 may be implemented as an API.

In an embodiment, the content region 830 may include a recommendation content region (recommend content) 831 for recommending content, and/or a content history data region (content history) 832 for managing or synchronizing a history of content consumed by a user. At least one of the recommendation content region 831 and the content history data region 832 may be implemented as an API.

In an embodiment, the meta agent server 810 may include an interface capable of communicating with a CP capsule server. For example, the CP capsule server may register at least one capsule to the meta agent server 810 by using the interface, and upload at least one content to the meta agent server 810.

In an embodiment, the meta agent server 810 may include an interface for communicating with a voice server 870. The meta agent server 810 may request to enable or disable a specific service provider (or CP), through the interface.

In an embodiment, a meta agent client 860 may be a client device accessing the meta agent server 810. The meta agent client 860 may display content 862 through a display 861, and enable a specific voice agent 863. The meta agent client 860 may request content to the meta agent server 810 and receive the same.

Figure 9:
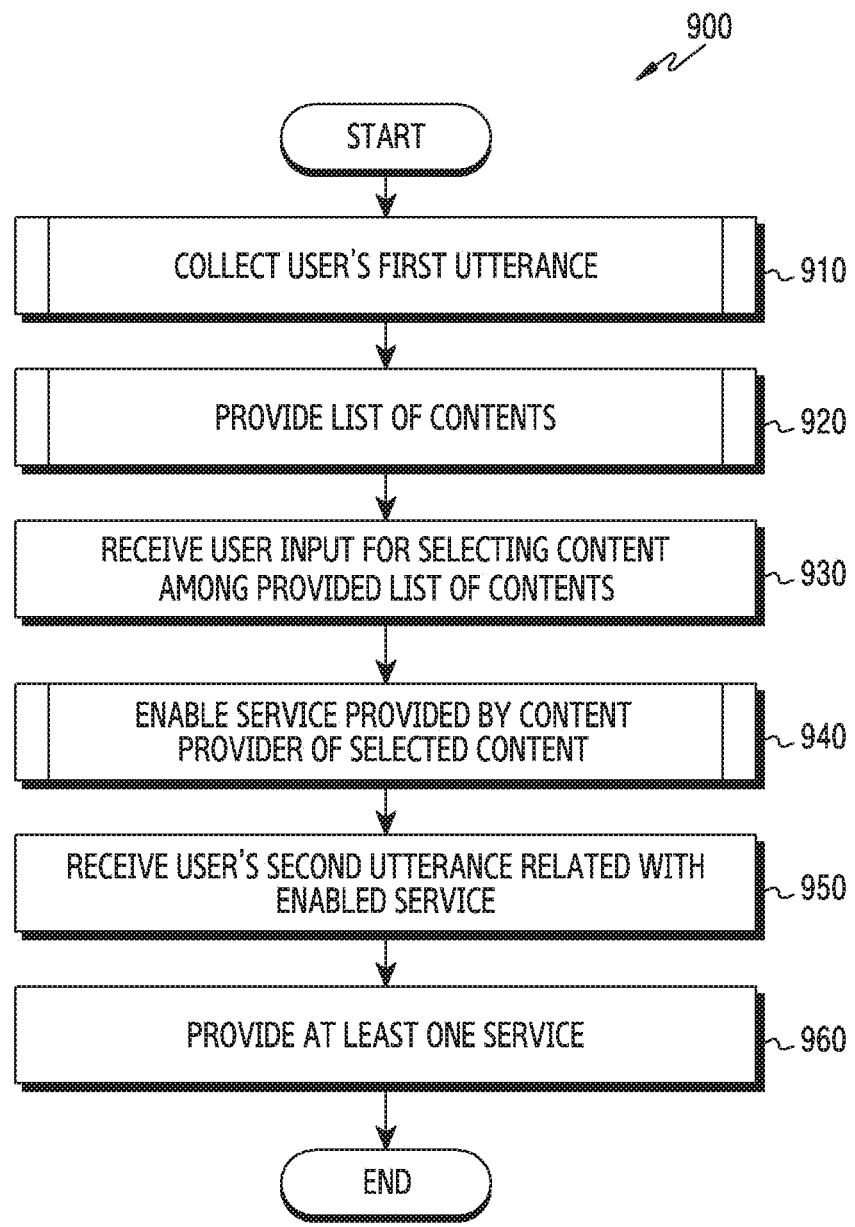
FIG. 9 is a flowchart illustrating an operation flow of a speech recognition system according to an embodiment of the disclosure.

FIG. 9 is a flowchart illustrating an operation flow 900 of a speech recognition system according to an embodiment of the disclosure.

A plurality of operations disclosed in FIG. 9 may be performed by any one of the speech recognition systems 500, 600, and 700 disclosed in FIGS. 5, 6, and 7. Below, it is mentioned that the operations disclosed in FIG. 9 are performed by the speech recognition system 700.

Referring to FIG. 9, in operation 910, the speech recognition system 700 may receive a user's first utterance. In an embodiment, the first utterance may be an utterance requesting content or suggesting a request of content. For example, in response to the user utterance including a phrase or word (e.g., "Let me see", "I want to see you", and "Can you show me?") requesting content, or a phrase or word (e.g., "I'm bored" and "I'm tired") suggesting a request for content, the user utterance may be identified as the first utterance.

In another embodiment, the first utterance may be an utterance in which setting values of all CPs corresponding to a capsule are not set as "enabled". Here, the capsule may be identified by the text of the utterance. For example, in response to the setting values of all the CPs (CP1 402 and CP2 403) corresponding to the capsule (capsule 1 401 corresponding to "video reproduction") identified according to the text of the user utterance not being set as "enabled", the user utterance such as "Let me see a funny video" may be identified as the first utterance.

In a further embodiment, in response to the utterance requesting content or suggesting a request for content, and the setting values of all the CPs corresponding to the capsule not being set as "enabled", the utterance may be identified as the first utterance.

In an embodiment, the speech recognition system 700 may receive the user's first utterance through a microphone (e.g., the microphone 120 of FIG. 1).

In an embodiment, in response to the received user utterance being identified as the first utterance, the speech recognition system 700 may enable a specific module of the speech recognition system 700. For example, in response to identifying the received user utterance as the first utterance, the planner module 714 or the natural language understanding module 708 may enable the meta agent 720 (or enter the meta agent 720), or transmit related data to the meta agent 720.

In an embodiment, in operation 920, the speech recognition system 700 may provide a list of contents. The speech recognition system 700 may provide a list of contents received from at least one CP, based at least partly on user profile information (e.g., a gender of a user, an age, a current location, a current time, residence area information, birthday information, and preference information). For example, the speech recognition system 700 may provide a list of contents including an image related to an action movie or music with fast beats in a video streaming platform, based on preference information that a user is an adult and loves an action genre. For another example, in response to the user being a child, the speech recognition system 700 may provide a list of contents including an image related to education or an image related to a character cartoon. In an embodiment, the provision of the list of contents may be performed by the meta agent 720. For further example, the speech recognition system 700 may provide a list of contents including a comics D getting the highest popularity from a man in his 30s among a plurality of comics which are uploaded to a comics platform C, based on information that the user is a thirty-year-old man. The electronic device 501 may display the provided list of contents through a display (e.g., the display 140 of FIG. 1).

In an embodiment, in operation 930, the speech recognition system 700 may receive a user input for selecting content among the provided list of contents. In an embodiment, the speech recognition system 700 may receive a user input for selecting at least one content among the list of contents displayed on the display 140 of the electronic device 501. For example, in response to a list of a plurality of contents including the comics D being provided, the display 140 may receive a user input selecting the comics D among the provided list.

Though not illustrated, in response to a user input for selecting content, the speech recognition system 700 may provide the selected content to a user. For example, in response to a user input selecting the comics D, the meta agent 720 may provide sample content (e.g., content of episode 1) of the comics D stored in the second memory 726, to the user.

Though not illustrated, in response to the provided content being used (or consumed) by the user, the speech recognition system 700 may transmit related data to a corresponding service provider (or CP), or store the same in the second memory 726.

Though not illustrated, the speech recognition system 700 may additionally provide content different from sample content, based on a user input. For example, in response to content of episode 1 being provided as sample content of the comics D, the speech recognition system 700 may provide content of episode 2 in response to a user input requesting next content. In response to content different from the sample content not being stored in the second memory 726, the speech recognition system 700 may request the different content to a corresponding CP.

In an embodiment, in operation 940, the speech recognition system 700 may enable a service provided by a content provider of the selected content. In an embodiment, the speech recognition system 700 may enable the service provided by the content provider of the selected content, by assigning a specific value to the content provider providing the selected content. The value assigned (or set) to the content provider may be a value related to the processing of a user utterance that will be inputted later, and may be implemented in a binary form ("enabled" or "disabled"). For example, in response to the "enabled" value being set to the content provider providing the selected content, although a user does not expressly say a user utterance specifying or including the content provider later, the speech recognition system 700 may generate a plan that will be provided to the user, based on the content provider.

In an embodiment, the speech recognition system 700 may enable a service provided by the content provider of the selected content (or a content provision service provided by the content provider of the selected content), based on a user input. For example, while the selected content is provided, the speech recognition system 700 may enable a service provided by the content provider (e.g., CP3 412) of the selected content, based on a user input to a user interface provided together with the selected content. For another example, the speech recognition system 700 may enable the service provided by the content provider of the selected content, independently from (or regardless of) a user input. For example, in response to the selected content being a series work, and a user having continuously consumed a previously specified number of contents, the speech recognition system 700 may enable, although there is not a user input, the service provided by the content provider of the selected content. In this case, the speech recognition system 700 may output a notification for notifying the user that the service provided by the content provider of the selected content is enabled.

In an embodiment, in operation 950, the speech recognition system 700 may receive a user's second utterance related to the enabled service. For example, the speech recognition system 700 may receive a second utterance such as "Let me see a comics which I have seen last time".

In an embodiment, the speech recognition system 700 may receive the user's second utterance, which includes a word or keyword (e.g., "last time") suggesting the enabled service.

In an embodiment, even though there is not a word or keyword suggesting the enabled service, the speech recognition system 700 may receive a user's second utterance including a word or keyword from which the speech recognition system 700 is able to infer the enabled service as well.

In an embodiment, in operation 960, the speech recognition system 700 may provide at least one service.

In an embodiment, the speech recognition system 700 may provide at least one service through the enabled service. For example, the speech recognition system 700 may provide at least one service, by using the enabled content provision service among a plurality of services which can be used for processing of the user's second utterance.

In an embodiment, operation 960 may be performed regardless of (or independently from) the meta agent 720.

In an embodiment, the planner module 714 may identify the capsule 2 411 corresponding to "comics", based on the text of the second utterance, and identify a CP (e.g., CP3 412) set as "enabled" among at least one CP corresponding to the identified capsule 2. The planner module 714 may generate a plan that will be transmitted to the electronic device, based on at least one of the capsule 2 411 and the CP3.

In an embodiment, the planner module 714 may provide at least one service, by using data stored in the first memory 712. The speech recognition system 700 may provide at least one service by using user history data stored in the second memory 726. For example, in response to episode 1 to episode 3 of a comics D being provided in operation 930, the speech recognition system 700 may confirm that the user has already consumed the episode 1 to episode 3 of the comics D by using the user history data, and in response to the user's second utterance such as "Let me see the comics I have seen last time", provide episode 4 of the comics D to the user.

Figure 10:
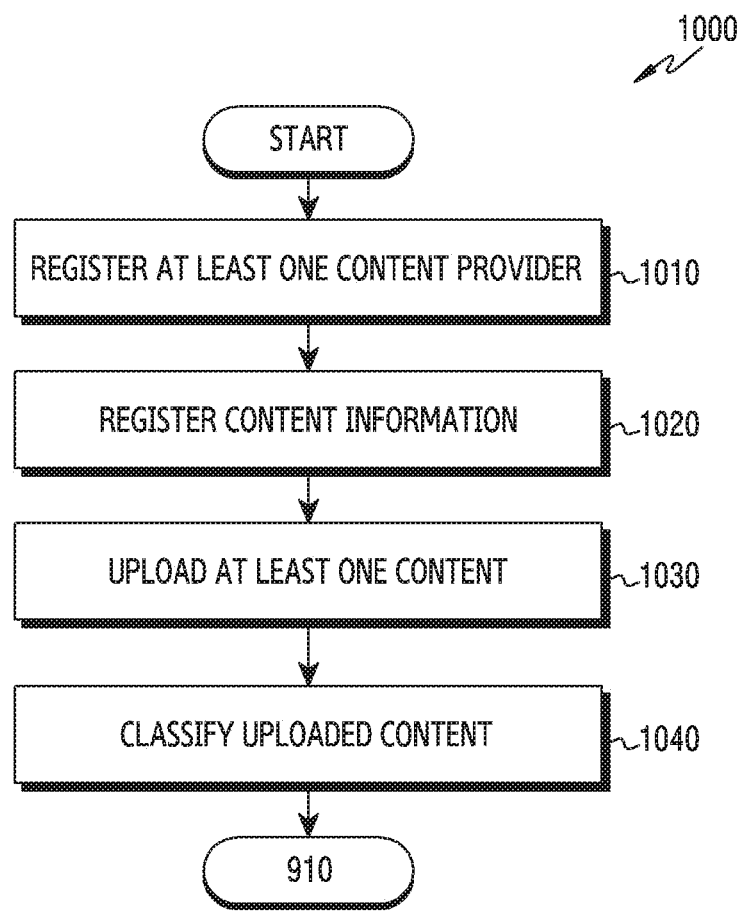
FIG. 10 is a diagram for explaining, in detail, an operation that a speech recognition system performs before receiving a user's first utterance according to an embodiment of the disclosure.

FIG. 10 is a diagram for explaining, in detail, a flow 1000 of an operation that the speech recognition system performs before receiving a user's first utterance according to an embodiment of the disclosure.

A plurality of operations disclosed in FIG. 10 may be performed by any one of the speech recognition systems 500, 600, and 700 disclosed in FIGS. 5, 6, and 7. Below, it is mentioned that the operations disclosed in FIG. 10 are performed by the speech recognition system 700.

Referring to FIG. 10, in operation 1010, the speech recognition system 700 may register at least one CP. For example, the speech recognition system 700 may register the CP1 402 to the meta agent 720.

In an embodiment, in operation 1020, the speech recognition system 700 may register content information. In an embodiment, the speech recognition system 700 may issue an app ID to at least one CP registered to the meta agent 720, and register content information from the at least one CP registered to the meta agent 720. For example, the speech recognition system 700 may register information about a content type.

In an embodiment, in operation 1030, the speech recognition system 700 may upload at least one content. In an embodiment, the meta agent 720 may upload at least one content from the registered at least one CP. For example, the meta agent 720 may upload sample content (e.g., content of episode 1) of a comics D from the CP3 412 corresponding to the comics platform C.

In an embodiment, in operation 1040, the speech recognition system 700 may classify the uploaded at least one content. In an embodiment, the meta agent 720 may classify the uploaded at least one content by content characteristic. In an embodiment, the meta agent 720 may classify the uploaded at least one content wherein the at least one content corresponds to at least one of an age, a gender, an area, and time. For example, the meta agent 720 may classify sample content of the comics D uploaded from the CP3 412 corresponding to the comics platform C and a sample image of episode 20 of an entertainment program J uploaded from the CP1 402 corresponding to a video streaming platform Y wherein the sample content and the sample image correspond to a man in his 30s. By classifying the uploaded at least one content by content characteristic, the speech recognition system 700 may prepare content wherein the content can be matched with a user characteristic and provided.

Figure 11:
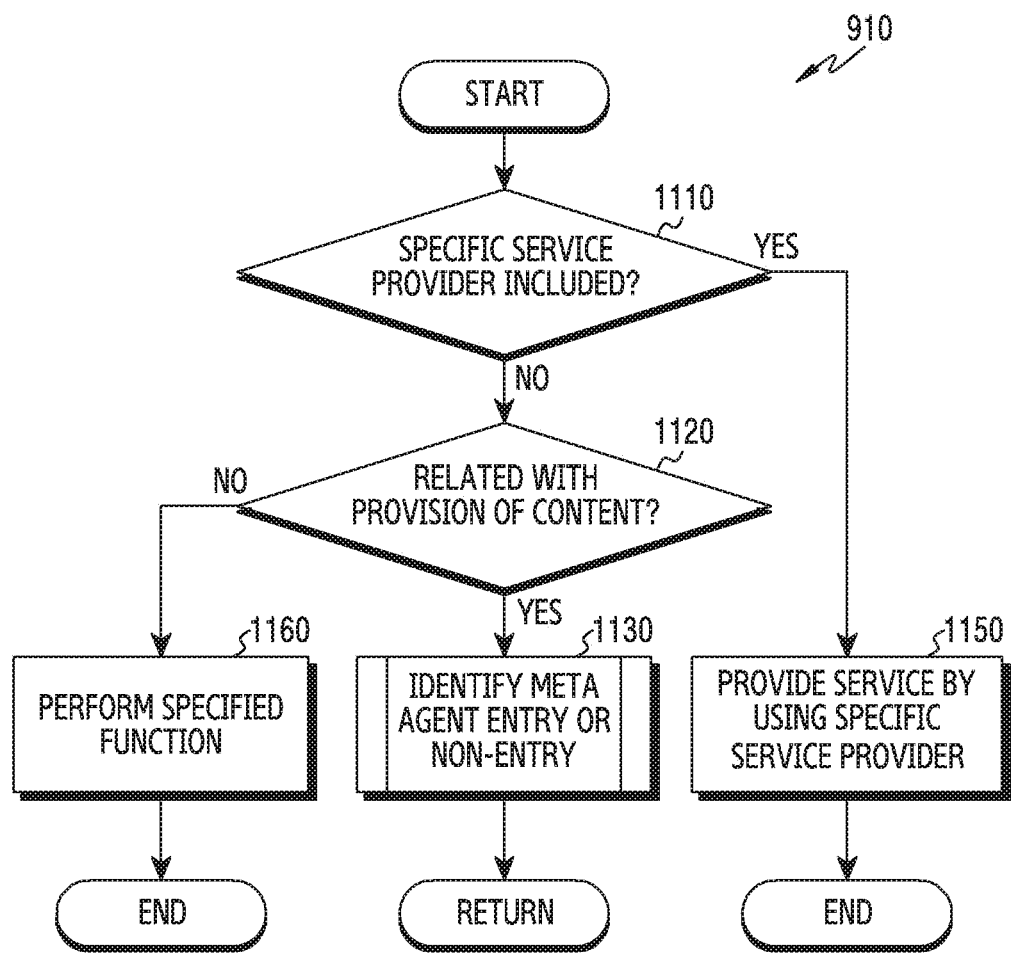
FIG. 11 is a diagram for explaining, in detail, an operation of receiving a user's first utterance according to an embodiment of the disclosure.

FIG. 11 is a diagram for explaining, in detail, an operation of receiving, by a speech recognition system, a user's first utterance according to an embodiment of the disclosure.

FIG. 11 may be a detailed flowchart of operation 910 of FIG. 9.

Referring to FIG. 11, in operation 1110, the speech recognition system 700 may identify whether a first utterance is an utterance including a specific service provider. In an embodiment, the natural language understanding module 708 may identify whether the first utterance includes a keyword indicating the specific service provider. For example, in response to the first utterance being "Let me see anything funny", the natural language understanding module 708 may identify that the first utterance does not include a keyword indicating a specific service provider. For another example, in response to the first utterance being "Let me see a funny video in Y", the natural language understanding module 708 may identify that the first utterance includes a keyword (Y) indicating a specific service provider.

In an embodiment, in response to the first utterance being the utterance including the specific service provider (example of operation 1110), in operation 1150, the speech recognition system 700 may provide at least one service by using the specific service provider. For example, in response to the first utterance being "Let me see a funny video in Y", the planner module 714 may generate a plan corresponding to the received user utterance, by using the CP1 402 corresponding to the video streaming platform Y.

In an embodiment, in response to the first utterance not being the utterance specifying the specific service provider (No in operation 1110), in operation 1120, the speech recognition system 700 may identify whether the first utterance is an utterance related to the provision of content. The speech recognition system 700 may identify whether the first utterance is an utterance expressly requesting the provision of content or suggesting the provision of content. In an embodiment, in response to the user utterance including a phrase or word (e.g., "Let me see", "I want to see you", and "Can you show me?") requesting content, or a phrase or word (e.g., "I'm bored" and "I'm tired") suggesting a request for content, the natural language understanding module 708 may identify that the first utterance is the utterance requesting the provision of content or suggesting a request for the provision of content.

In an embodiment, in response to the first utterance not being the utterance requesting the provision of content or suggesting the request for the provision of content (No in operation 1120), in operation 1160, the speech recognition system 700 may perform a specified function of the user utterance.

In an embodiment, in response to the first utterance being the utterance requesting the provision of content or suggesting the request for the provision of content (Yes in operation 1120), in operation 1130, the speech recognition system 700 may identify whether the speech recognition system 700 enters the meta agent 720. The speech recognition system 700 may identify whether the speech recognition system 700 enters the meta agent 720, by using information about a capsule identified based on the text of the first utterance. For example, in response to there being the CP1 402 corresponding to the identified capsule 1 401 and set as "enabled", the planner module 714 may, without entering the meta agent 720, generate a plan that will be transmitted to the electronic device 501. For another example, in response to there not being at least one CP corresponding to the identified capsule 1 401 and set as "enabled", the planner module 714 may identify that the speech recognition system 700 enters the meta agent 720.

Figure 12:
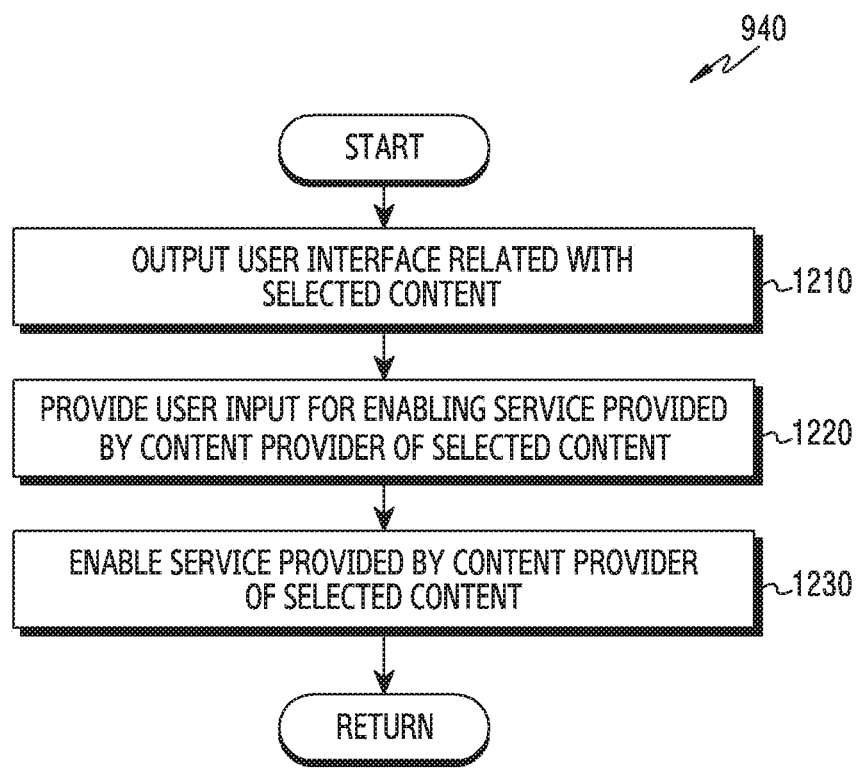
FIG. 12 is a diagram for explaining, in detail, an operation of enabling a service provided by a content provider of selected content according to an embodiment of the disclosure.

FIG. 12 is a flowchart illustrating an operation flow of a speech recognition system according to an embodiment of the disclosure.

FIG. 12 may be a detailed flowchart of operation 940 of FIG. 9.

Referring to FIG. 12, in operation 1210, the speech recognition system 700 may output a user interface related to the selected content. In an embodiment, the user interface related to the selected content may be a user interface for setting a specific value to a content provider corresponding to the selected content. For example, in response to a user's first utterance such as "I'm bored. What is anything funny?", the electronic device 501 may display episode 1 of a comics D which is uploaded to a comics platform C on the display 140. In this case, the speech recognition system 700 may display the user interface (e.g., a check box), together with the episode 1 of the comics D. By outputting the user interface related to the selected content, the speech recognition system 700 may guide wherein the user sets the specific value to the content provider of the selected content.

In an embodiment, in operation 1220, the speech recognition system 700 may provide a user input for enabling a service provided by the content provider of the selected content. For example, in response to the speech recognition system 700 displaying the check box together with the episode 1 of the comics D, the speech recognition system 700 may provide a user input to the displayed check box.

In an embodiment, in operation 1230, the speech recognition system 700 may enable the service provided by the content provider of the selected content. In an embodiment, in response to the provided user input, the speech recognition system 700 may enable the service provided by the content provider of the selected content. For example, in response to providing the user input to the check box displayed together with the episode 1 of the comics D, the speech recognition system 700 may enable a service provided by a comics platform C which is a service provider providing the comics D. By specifying a specific value to the CP3 412 corresponding to the comics platform C, the speech recognition system 700 may enable the service provided by the content provider of the selected content. Even though a user does not expressly say a user utterance specifying or including the content provider later, the speech recognition system 700 may generate a plan that will be provided to the electronic device 501, based on the content provider.

Figure 13:
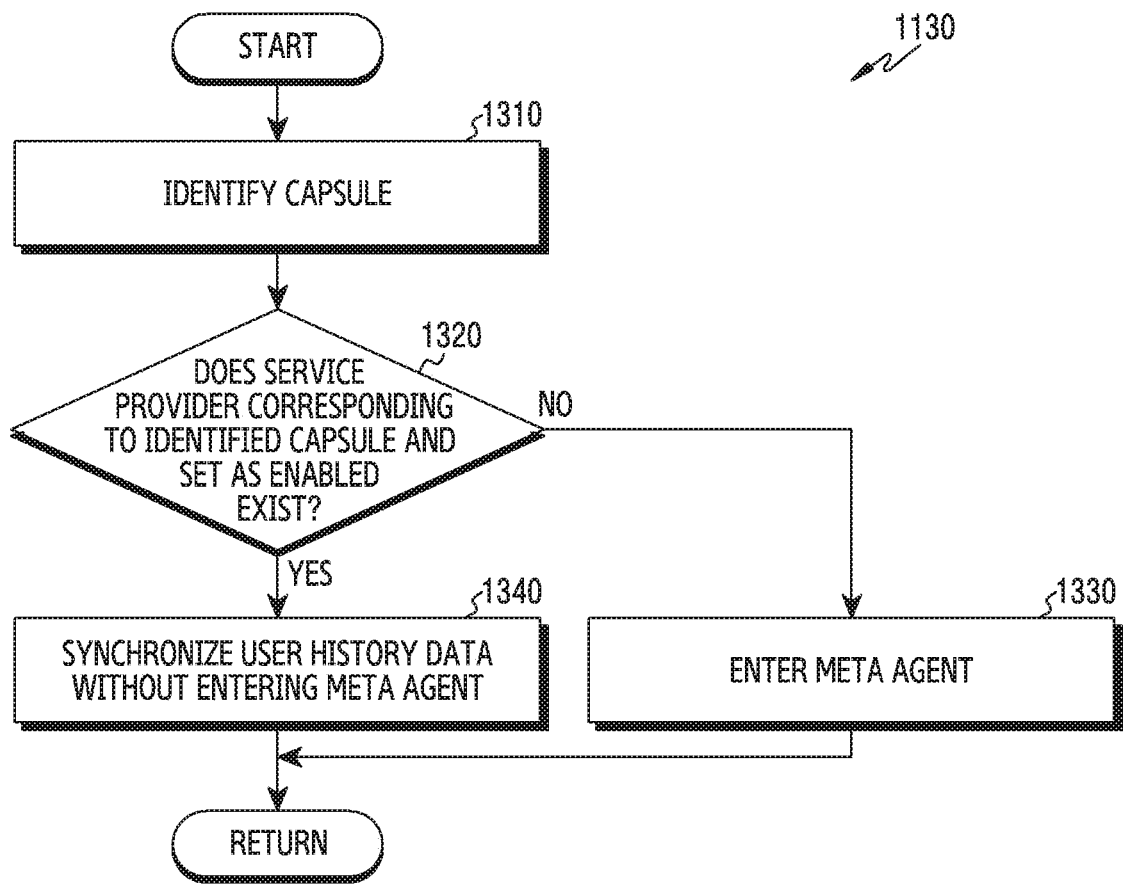
FIG. 13 is a diagram for explaining, in detail, an operation of identifying meta agent entry or non-entry according to an embodiment of the disclosure.

FIG. 13 is a diagram for explaining, in detail, an operation of identifying meta agent entry or non-entry according to an embodiment of the disclosure.

FIG. 13 may be a detailed flowchart of operation 1130 of FIG. 11.

Referring to FIG. 13, in operation 1310, the speech recognition system 700 may identify a capsule.

In an embodiment, the speech recognition system 700 may identify at least one capsule necessary for performing a task of a user utterance, in the concept action network 400, based on the text of a first utterance. For example, in response to the user's first utterance such as "I'm bored. What is anything funny?", the planner module 714 may identify the capsule 2 411 corresponding to "comics", based on the text of the first utterance.

In an embodiment, by additionally using a user profile, the speech recognition system 700 may identify the at least one capsule necessary for performing the task of the user utterance as well.

In an embodiment, in operation 1320, the speech recognition system 700 may identify whether at least one service provider (CP) corresponding to the identified capsule and set as "enabled" exists. For example, the planner module 714 may identify whether the at least one CP set as "enabled" exists among the CP3 412 and the CP4 413 corresponding to the capsule 2 411.

In an embodiment, in response to it being identified that the at least one CP corresponding to the identified capsule and set as "enabled" does not exist (No in operation 1320), in operation 1330, the speech recognition system 700 may enter the meta agent 720. In an embodiment, the speech recognition system 700 may enable the meta agent 720, or transmit related data to the meta agent 720.

In an embodiment, in response to it being identified that the at least one CP corresponding to the identified capsule and set as "enabled" exists (Yes in operation 1320), in operation 1340, the speech recognition system 700 may synchronize user history data, without entering the meta agent 720. For example, the planner module 714 may synchronize user history data of the CP3 412 stored in the CP database of the first memory 712, without transmitting related data to the meta agent 720. The planner module 714 may obtain history data that a user has consumed episode 1 to episode 3 of the comics D of the comics platform C through the meta agent 720, from the second memory 726 of the meta agent 720. By using the history data obtained from the second memory 726, the planner module 714 may synchronize the user history data of the CP3 412 stored in the CP database of the first memory 712.

Figure 14:
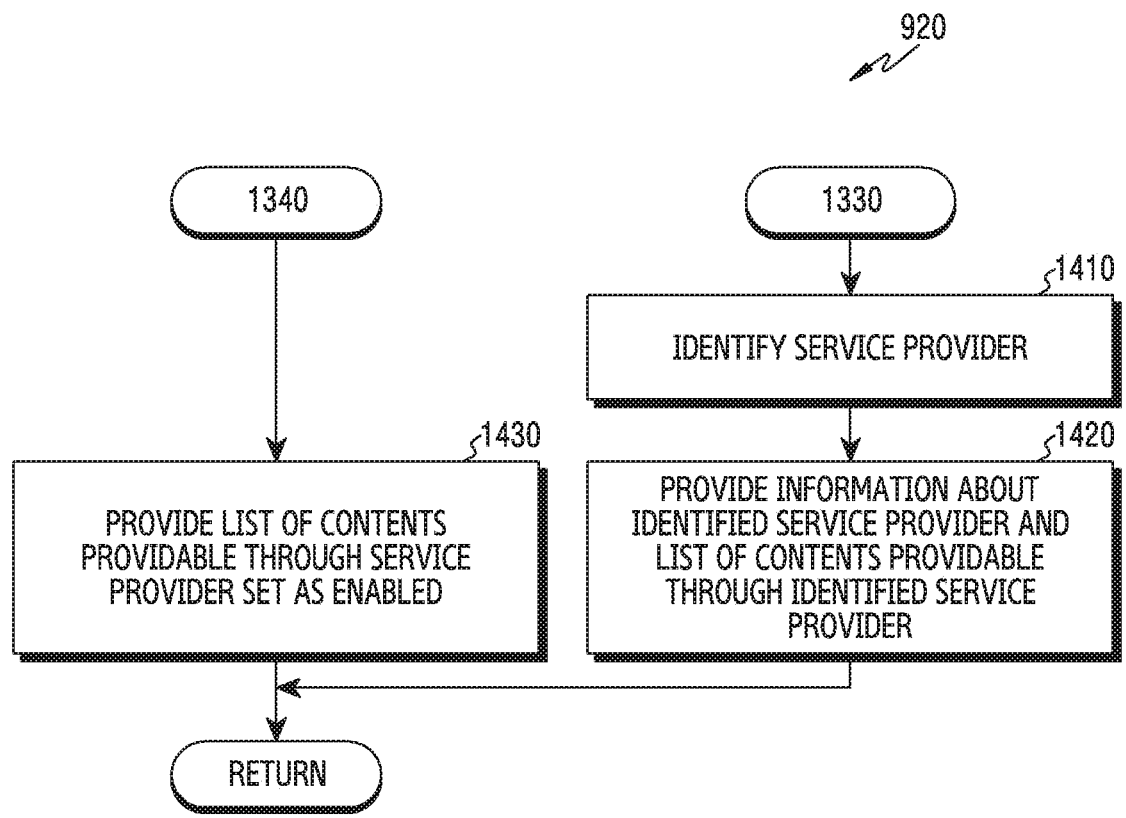
FIG. 14 is a diagram for explaining, in detail, an operation of providing a list of contents according to an embodiment of the disclosure.

FIG. 14 is a diagram for explaining, in detail, an operation of providing a list of contents according to an embodiment of the disclosure.

FIG. 14 may be a detailed flowchart of operation 920 of FIG. 9.

Referring to FIG. 14, in response to entering the meta agent 720 (operation 1330), in operation 1410, the speech recognition system 700 may identify at least one service provider (or CP). The speech recognition system 700 may identify the at least one CP, based at least partly on user profile information. For example, the meta agent 720 may identify at least one CP (e.g., CP3 412 corresponding to the comics platform C), based on the user profile information, among CPs corresponding to the identified capsule (e.g., the capsule 2 411 corresponding to "comics").

In an embodiment, in operation 1420, the speech recognition system 700 may provide information about the identified CP and a list of contents providable through the identified CP. For example, the meta agent 720 may provide the list of contents to a user, by using the content classified by characteristic and stored in the second memory 726 and the user profile information.

The reason of, unlike operation 1430, additionally providing the information about the identified CP in operation 1420 is that operation 1420 is performed when at least one CP corresponding to the identified capsule and set as "enabled" does not exist. That at least one CP is not set as "enabled" may be identified that a user does not have a history of receiving a service from the identified at least one service provider, or has the history of receiving the service but the at least one service provider is not impressive enough to perform an additional input for setting the at least one service provider as "enabled". Accordingly to this, the speech recognition system 700 may additionally provide information about the identified at least one CP as well as the list of contents providable through the at least one CP.

In an embodiment, the speech recognition system 700 may additionally provide a basis for identifying the CP, or a basis for identifying the list of contents. For example, information that the CP or the list of contents has been identified based on preferences of those of a similar age category may be additionally provided.

In an embodiment, in response to synchronizing the user history data without the entering of the meta agent 720 (operation 1340), in operation 1430, the speech recognition system 700 may provide the list of contents providable through the CP set as "enabled". That at least one service CP is set as "enabled" may be identified that a user has a history of receiving a service from the identified at least one service provider, or the at least one service provider is impressive enough to perform an additional input for setting the at least one service provider as "enabled". Accordingly to this, the speech recognition system 700 may just provide only the list of contents providable by the identified at least one service provider, and not provide the information about the identified at least one service provider.

In an embodiment, the speech recognition system 700 may provide the list of contents, by using the synchronized user history data. For example, in response to the user having ever seen episode 1 to episode 3 of a comics D through the meta agent 720, the speech recognition system 700 may provide the list of contents not including the episode 1 to episode 3 of the comics D.

FIGS. 15A, 15B, 16A and 16B are diagrams illustrating a user interface provided by a speech recognition system according to various embodiments of the disclosure.

Referring to FIG. 15A, in response to a user utterance, the speech recognition system (e.g., the speech recognition system 700 of FIG. 7) may provide a user interface 1510 related to the user utterance. For example, in response to a user utterance such as "I'm bored", the speech recognition system 700 may identify a capsule (e.g., a "comics" capsule 2 411), based on the text of the user utterance, and may identify at least one service provider (e.g., CP3 412 signifying the comics platform C) corresponding to the identified capsule 2 411. The speech recognition system 700 may provide content provided by the at least one service provider (CP3 412) to the user through the user interface 1510. For example, a meta agent (e.g., the meta agent 720 of FIG. 7) may provide the user with sample content provided by the at least one service provider (CP3 412) stored in the second memory 726. For detailed example, the speech recognition system 700 may output a description 1512 and a preview 1514 of sample content (e.g., episode 1) of a comics D, together with a guide message such as "How do you think about comics D when bored?". In an embodiment, the speech recognition system 700 may output objects 1513 for controlling a sequence of reproduction of the sample content (e.g., episode 1) of the comics D.

In an embodiment, the speech recognition system 700 may provide a user interface 1516 for setting a specific value to a service provider related to content which is being currently provided. For example, the speech recognition system 700 may provide the user with a check box (e.g., user interface 1516) for setting an "enabled" value to the service provider (CP3 412) providing content which is being currently provided.

In an embodiment, the speech recognition system 700 may provide an object 1518 for providing the next content (e.g., episode 2) subsequent to the content which is being currently provided.

Referring to FIG. 15B, in response to a user input to the object 1518, the speech recognition system 700 may provide a user interface 1520 related to the user input to the object 1518. The speech recognition system 700 may provide a description 1522 and a preview 1524 of the next content (e.g., episode 2) subsequent to the content (e.g., episode 1) which is being currently provided. In an embodiment, in response to the requested next content (e.g., episode 2) having not been stored in the second memory 726, the meta agent 720 may request additional content to the CP3 412. In an embodiment, the speech recognition system 700 may provide an object 1523 for controlling a sequence of reproduction of content of episode 2 and objects 1526 and 1528 for providing previous content (e.g., episode 1) and next content (e.g., episode 3).

FIGS. 16A and 16B are diagrams illustrating a user interface provided by a speech recognition system according to various embodiments of the disclosure.

Referring to FIG. 16A, in response to a user utterance, the speech recognition system (e.g., the speech recognition system 700 of FIG. 7) may provide a user interface 1610 related to the user utterance. For example, in response to a second user utterance such as "Let me see the comics I have seen last time", the speech recognition system 700 may identify a capsule (e.g., the "comics" capsule 2 411), based on the text of the second user utterance, and may identify at least one service provider corresponding to the identified capsule 2 411. The speech recognition system 700 may identify at least one service provider (CP3 412) corresponding to a comics capsule and set as "enabled".

In an embodiment, the speech recognition system 700 may provide at least one content provided by the identified at least one service provider, based on user history data. For example, the speech recognition system 700 may provide a description 1612 and a preview 1614 of episode 4 of a comics D, based on the user history data that a user has ever seen episode 1 to episode 3 of the comics D.

In an embodiment, the speech recognition system 700 may provide an object 1617 or 1618 for providing previous content (episode 3) or next content (episode 5) subsequent to the content (e.g., episode 4) which is being currently provided.

In an embodiment, the speech recognition system 700 may provide even an object 1616 for providing a list of comics D. In response to a user input to the object 1616 being provided, the speech recognition system 700 may provide the list of comics D and the previous consumption or non-consumption of comics D to the user, based on user history data stored in the first memory 712. Referring to a user interface 1620 disclosed in FIG. 16B, the speech recognition system 700 may output data indicating that episode 1 to episode 3 of the comics D have been consumed by the user, and the remaining episodes of the comics D have not been consumed by the user.

Though not illustrated, the speech recognition system 700 may additionally output data about a content consumption path as well. For example, the speech recognition system 700 may output data indicating that episode 1 to episode 2 have been consumed by the content recommendation of the meta agent 720, and episode 3 has been consumed through a path independent from the meta agent 720 (for example, has been consumed by using the "enabled" service provider (CP3 412)).

Though not illustrated, the speech recognition system 700 may additionally output data about a date of consumption of content and the number of consumption as well.

The computer-readable recording medium may include a hard disk, a floppy disk, a magnetic medium (e.g., a magnetic tape), an optical recording medium (e.g., a compact disc-read only memory (CD-ROM), a digital versatile disc (DVD)), a magneto-optical medium (e.g., a floptical disk), an internal memory, etc. An instruction may include a code which is made by a compiler or a code which is executable by an interpreter. A module or program module of various embodiments may include at least one or more of the aforementioned constituent elements, or omit some constituent elements, or further include another constituent element. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A system comprising:
a user interface;
a microphone;
a speaker;
at least one processor operatively connected with the user interface, the microphone, and the speaker; and
at least one memory operatively connected with the processor,
wherein the memory stores instructions which, when executed, configure the processor to:
receive a first user utterance requesting content or suggesting a request for content, through the microphone,
identify whether the first user utterance includes a keyword capable of identifying a specific content provider,
in case that the first user utterance comprises the keyword, provide the specific content through the identified specific content provider,
in case that the first user utterance does not comprises the keyword:
provide a list of contents received from at least one content provider, based at least partly on user information stored in the memory,
receive a user input selecting content from the list of contents,
enable a content providing service provided by a content provider of the selected content independent of the user input selecting the content,
after the enabling of the content providing service, receive a second user utterance related to the enabled content providing service, through the microphone,
provide at least one service through the enabled content providing service, and
store the user information in response to providing the at least one service through the enabled content providing service.

2. The system of claim 1, wherein the user information comprises at least one of a gender of the user, an age of the user, a current location of the user, a current time, a residence area information, birthday information and preference information.

3. The system of claim 1, wherein:
the first user utterance is processed by a meta agent,
the second user utterance is processed independently from the meta agent, and
the meta agent is a capsule for processing a user utterance not comprising a keyword for identifying the specific content provider, under a specified condition.

4. The system of claim 3, wherein the memory further stores instructions which, when executed, configure the processor to, after receiving the first user utterance, identify entry or non-entry into the meta agent.

5. The system of claim 4, wherein the memory further stores instructions which, when executed, configure the processor to, after receiving the first user utterance, identify at least one capsule necessary for performing a task of the first user utterance, based on text of the first user utterance.

6. The system of claim 5,
wherein the at least one capsule corresponds to at least one content provider for performing a function of a domain related to the capsule,
wherein the at least one content provider each specifies a setting value related to processing of a user utterance that will be inputted later, and
wherein the setting value is specified as one of a first value being a default or a second value different from the first value.

7. The system of claim 6, wherein the memory further stores instructions which, when executed, configure the processor to identify whether to enter the meta agent, based on the setting value specified to the at least one content provider corresponding to the identified at least one capsule, as part of an operation of identifying whether to enter the meta agent.

8. The system of claim 7, wherein the memory further stores instructions which, when executed, configure the processor to, when the content provider corresponding to the identified at least one capsule and specified to the second value does not exist, enter the meta agent, as part of the operation of identifying whether to enter the meta agent.

9. The system of claim 7, wherein the memory further stores instructions which, when executed, configure the processor not to, when the at least one content provider corresponding to the identified at least one capsule and specified to the second value exists, enter the meta agent, as part of the operation of identifying whether to enter the meta agent.

10. The system of claim 9, wherein the memory further stores instructions which, when executed, configure the processor to, when the at least one content provider corresponding to the identified at least one capsule and specified to the second value exists, synchronize user history data related to the existing at least one content provider, as part of the operation of identifying whether to enter the meta agent.

11. The system of claim 8, wherein the memory further stores instructions which, when executed, configure the processor to, as part of an operation of providing the list of contents:
after entering the meta agent, identify the at least one content provider corresponding to the identified at least one capsule, based on user profile information, and
provide information about the identified at least one content provider and a list of contents providable through the identified at least one content provider.

12. The system of claim 10, wherein the memory further stores instructions which, when executed, configure the processor to provide a list of contents provided through the content provider specified to the second value, as part of an operation of providing the list of contents.

13. The system of claim 3, wherein the memory further stores instructions which, when executed, configure the processor to, in response to the receiving of the user input for selecting the content, provide the selected content to a user.

14. The system of claim 13, wherein the memory further stores instructions which, when executed, configure the processor to, while providing the selected content to the user, additionally provide a user interface for specifying the second value to the content provider providing the selected content.

15. The system of claim 14, wherein the memory further stores instructions which, when executed, configure the processor to, in response to the providing of a user input to the provided user interface, specify the second value to the content provider providing the selected content, as part of the operation of enabling the content providing service provided by the content provider of the selected content.

16. The system of claim 3, wherein the second user utterance related to the enabled content providing service is an utterance received while a content provider corresponding to a capsule related to the second user utterance and specified to the second value exists.

17. The system of claim 16, wherein the memory further stores instructions which, when executed, configure the processor to provide a user with at least one content provided by the content provider corresponding to the capsule related to the second user utterance and specified to the second value, as at least part of the operation of providing the at least one service.

18. The system of claim 17, wherein the memory further stores instructions which, when executed, configure the processor to, in consideration of user history data related to the content provider corresponding to the capsule related to the second user utterance and specified to the second value, provide the user with the at least one content provided by the content provider, as part of the operation of providing the at least one service.

19. The system of claim 18, wherein the user history data is data about a history in which the user is provided with content provided by the meta agent or the content provider independent from the meta agent.

20. The system of claim 3, wherein the memory further stores instructions which, when executed, configure the processor to, before receiving the first user utterance:
- register at least one content provider to the meta agent,
- upload at least one content from the registered at least one content provider to the meta agent, and
- classify the at least one content registered to the meta agent.

* * * * *